(12) United States Patent
Reed et al.

(10) Patent No.: US 7,061,970 B2
(45) Date of Patent: Jun. 13, 2006

(54) SELF-SYNCHRONIZING ADAPTIVE MULTISTAGE RECEIVER FOR WIRELESS COMMUNICATION SYSTEMS

(75) Inventors: Irving S. Reed, Santa Monica, CA (US); Piyapong Thanyasrisung, Northridge, CA (US); J. Scott Goldstein, Centreville, VA (US); T. K. Truong, San Marino, CA (US)

(73) Assignee: Irving Reed, Santa Monica, CA (US)

( * ) Notice: Subject to any disclaimer, the term of this patent is extended or adjusted under 35 U.S.C. 154(b) by 1060 days.

(21) Appl. No.: 09/883,835

(22) Filed: Jun. 18, 2001

(65) Prior Publication Data
US 2002/0136277 A1  Sep. 26, 2002

Related U.S. Application Data

(60) Provisional application No. 60/248,469, filed on Nov. 14, 2000.

(51) Int. Cl.
*H04B 1/69* (2006.01)
(52) U.S. Cl. .................. 375/148; 375/136; 375/147; 375/232; 370/232
(58) Field of Classification Search ........... 375/148, 375/206, 208, 207, 130, 135, 136, 140, 146, 375/147, 229, 232; 370/232
See application file for complete search history.

(56) References Cited

U.S. PATENT DOCUMENTS 5,396,515 A * 3/1995 Dixon et al. ............. 375/150
5,930,229 A * 7/1999 Yoshida et al. ........... 370/203

(Continued)

OTHER PUBLICATIONS

MMSE interference suppression for direct-sequence spread-spectrum CDMA Madhow, U.; Honig, M.L.; Communications, IEEE Transactions on, vol.: 42 , Issue: Dec. 12, 1994 pp. 3178-3188.*

(Continued)

*Primary Examiner*—Shuwang Liu
(74) *Attorney, Agent, or Firm*—Christie, Parker & Hale, LLP

(57) ABSTRACT

The present invention discloses an adaptive near-far resistant receiver for wireless communication systems, such as, asynchronous DS-CDMA systems, without the use of prior synchronization. The only requirement is knowledge of the spreading code of the desired user. Also there is no need of a training period or of data-free observations. In one aspect the present system describes a method and system for filtering of an asynchronous wireless signal comprising the steps of receiving a data vector; of using the received data vector to update the weight coefficients of an adaptive filter without a prior knowledge of synchronization and without a need for a separate training period or data free observations.

In another aspect, the present system describes an adaptive near-far resistant receiver for an asynchronous wireless systems comprising means for receiving a data vector; means for; using the received data vector to update weight coefficients of an adaptive filter, and means for iterative multistage decomposition updating of the filter coefficients. In one embodiment the receiver uses an adaptive filter bank comprising a plurality of adaptive filters, wherein each filter corresponds to at least one different sampling time. An estimate of the timing is obtained from the maximum of a set of sequential outputs from the filter bank, The output that yields the maximum is preferably used to demodulate the information bit.

25 Claims, 23 Drawing Sheets

U.S. PATENT DOCUMENTS 6,005,886 A * 12/1999 Short .......................... 375/141
6,069,912 A *  5/2000 Sawahashi et al. ......... 375/142
6,614,864 B1 *  9/2003 Raphaeli et al. ............ 375/371

OTHER PUBLICATIONS

Near-far resistance of multiuser detectors in asynchronous channels Lupas, R.; Verdu, S.; Communications, IEEE Transactions on , vol.: 38 , Issue: Apr. 4, 1990 pp.: 496-508.*

Parkvall et al., Near-Far Resistent Receivers Without Priori Synchronization for Asynchronous DS-CDMA System, vol. 3, pp. 974-978, Sep. 22-25, 1996.*

Goldstein, J. Scott, et al.; "A New Method for Wiener Filtering and its Application to Interference Mitigation for Communications"; Annual Military Communications Conference; Mar., 1997; pp. 1087-1091; vol. 3, XP-000792586; IEEE; U.S.A.

Myrick, Wilbur L., et al.; "Anti-Jam Space-Time Preprocessor for GPS Based on Multistage Nested Wiener Filter"; Military Communications Conference Proceedings; 1999; pp. 675-681; XP010369639; IEEE; U.S.A.

Ström, Erik G., et al.; "Propagation Delay Estimation in Asynchronous Direct-Sequence Code-Division Multiple Access Systems"; IEEE Transactions on Communications; Jan., 1996; pp. 84-93; vol. 44, No. 1, XP000549645; IEEE; U.S.A.

* cited by examiner

| x(iTs) | x(iTs - Tc) | - - - - | x(iTs - (N-1)Tc) | X[i]

| x((i-1)Ts) | x((i-1)Ts - Tc) | - - - - | x((i-1)Ts - (N-1)Tc) | X[i-1]

:

| x((i-NS+1)Ts) | x((i-NS+1)Ts - Tc) | - - - - | x((i-NS+1)Ts - (N-1)Tc) | X[i-NS+1]

Figure 6

Figure 7: Block diagram of synchronization detector

SELF-SYNCHRONIZING ADAPTIVE MULTISTAGE RECEIVER FOR WIRELESS COMMUNICATION SYSTEMS

CROSS-REFERENCE TO RELATED APPLICATIONS

This patent application claims the benefit of the filing date of U.S. Provisional Patent Application Ser. No. 60/248,469, filed Nov. 14, 2000 and entitled "Adaptive Multistage Filter-Bank Receiver for Wireless Communication Systems," the entire contents of which are hereby expressly incorporated by reference.

FIELD OF THE INVENTION

The present invention relates to a filtering system and method for wireless communication signals. More specifically, the present invention is directed to a method and system for adaptively filtering asynchronous signals in wireless communication systems.

BACKGROUND OF THE INVENTION

Direct-sequence code-division multiple-access (DS-CDMA) has become an important component of recent communication systems. This is due to its many attractive properties for wireless communications such as the one depicted in FIG. 1A. In DS-CDMA communications, users' signals are multiplexed by distinct code waveforms, rather than by orthogonal frequency bands in frequency-division multiple access (FDMA), or by orthogonal time slots in time-division multiple access (TDMA). All users can transmit at the same time with each of them being allocated the entire available, broad-band, frequency spectrum for transmission. This method of channel allocation alleviates the problems commonly associated with other forms of channel allocation such as unused resources.

In CDMA, demodulation requires the suppression of two forms of noise, ambient channel noise, which is modeled as additive white Gaussian noise, plus multiple access interference (MAI), which is highly structured. The conventional receiver, which uses a simple correlation of the received signal and its user-spreading sequence (a standard matched filter), does not take into account the existence of MAI. The MAI caused by any one user is generally small, but as the number of interferers and their total power increases, the effects of MAI can become substantial. These effects fall within, what is called, the near-far problem.

The conventional receiver is severely limited by the effects of such MAI. One way to alleviate the MAI problem is to use power control schemes. However, power control is not easy to accomplish, especially in a wireless environment, where the power levels often vary dramatically. Even if perfect power control is used, the system may still need to be implemented with a forward error-correcting code to obtain a good performance. Another way of handling the near-far problem is to use near-far resistant receivers, which, in principle, can yield a substantial improvement over the standard receiver with perfect power control.

Multiuser detection techniques were proposed many years ago to mitigate the MAI problem. For example, S. Verdú, in "Minimum probability of error for asynchronous gaussian multiple-access channels," *IEEE Trans. on Inform. Theory*, vol. IT-32, pp. 85–96, January 1986, [1], the entire contents of which are hereby expressly incorporated by reference, proposed and found the optimal multiuser detection criterion and maximum-likelihood sequence detection for DS-CDMA. Unfortunately, Verdú's detection and demodulation methods were generally too complex to realize in a practical DS-CDMA system.

As a consequence, a number of simplified detector-demodulators have been proposed to obtain near optimal performance with reduced computational complexity. (For example, see R. Lupas and S. Verdú, "Linear multiuser detectors for synchronous code-division multiple-access channels," *IEEE Trans. On Inform. Theory*, vol. 35, pp. 123–136, January 1989 [2]; R. Lupas and S. Verdú, "Near-far resistance of multiuser detectors in asynchronous channels," *IEEE Trans. on Commun.*, vol. 38, pp. 496–508, April 1990 [3]; Z. Xie, R. T. Short, and C. K. Rushforth, "A family of suboptimum detectors for coherent multiuser communications," *IEEE J. Select. Areas Commun.*, vol. 8, pp. 683–690, May 1990 [4]; U. Madhow and M. L. Honig, "MMSE interference suppression for direct-sequence spread spectrum CDMA," *IEEE Trans. On Commun.*, vol. 42, pp. 3178–31888, December 1994 [5]; M. L. Honig and J. S. Goldstein, "Adaptive reduced-rank residual correlation algorithms for DS-CDMA interference suppression," in *Conference Record of the Thirty-Second Asilomar Conference on Signals, Systems & Computers*, 1998, vol. 1, pp. 551–555 [6]; and D. J. Lee, *Adaptive Detection of DS/CDMA Signals Using Reduced-Rank Multistage Wiener Filter*, Ph.D. thesis, University of Southern California, March 2000 [7], the contents of which are hereby expressly incorporated by reference.)

These receivers, however, deal primarily only with detectors that require a precise knowledge of the propagation delays of all users, which is usually unknown a priori. To use such an algorithm, the propagation delays need to be estimated and as a consequence, the receivers suffer from errors that occur with the estimation of the propagation delays. (See S. Parkvall, E. G. Strom, and B. Ottersten, "The impact of timing errors on the performance of linear ds-cdma receivers," *IEEE J. Select. Areas Commun.*, pp. 1660–1668, October 1996. [8], the contents of which are hereby expressly incorporated by reference). To obtain a better performance, the transmitters and receivers needed to be synchronized. Moreover, the transmitters and receivers, in this case, need to be synchronized in order to obtain a better performance. However, the synchronization requirement adds more complexity and cost to the system.

The conventional acquisition system that utilizes a tapped delay line with its weights being the elements of the spreading sequence also suffers from the same near-far problems. Many near-far resistant timing-acquisition algorithms have been developed. One approach is to jointly estimate the needed parameters of all users, as shown in Y. Steinberg and H. V. Poor, "On sequential delay estimation in wide-band digital communication systems," in *Proc. Intl. Symp. Information Theory*, San Antonio, Tex., 1993, p. 423 [9]; and S. Y. Miller and S. C. Schwartz, "Parameter estimation for asynchronous multiuser communications," in *Proc. Conf. Information Sciences and Systems*, Baltimore. Md., 1989, pp. 294–299 [10], the contents of which are hereby expressly incorporated by reference. While such techniques can provide excellent results, they are computationally complex.

Recently, maximum-likelihood synchronization of a single user is developed in S. E. Bensley and B. Aazhang. "Maximum-Likelihood synchronization of a single user for Code-Division Multiple-Access communication systems," *IEEE Trans. on Commun.*, pp. 392–399, March 1998 [11], the contents of which are hereby expressly incorporated by reference. However, the method in [11] requires a training period. This requirement is not feasible in certain situations. For example, whenever there is a significant change in the MAI level, during a deep fade or a turning-on of some near-in strong interferers, retraining is required, and the data transmission need to be interrupted accordingly. Similar limitations apply also to the minimum mean-square-error (MMSE) interference suppression techniques for the timing-acquisition, developed in U. Madhow, "MMSE interference suppression for timing acquisition and demodulation in Direct-Sequence CDMA systems," *IEEE Trans. on Commun.*, pp. 1065–1075, August 1998 [12], the contents of which are hereby expressly incorporated by reference.

By the use of a subspace decomposition technique, such as multiple signal classification (MUSIC), another type of timing estimator is developed in E. G. Ström, S. Parkvall, S. L. Miller, and B. E. Ottersten, "Propagation delay estimation in asynchronous direct-sequence code-division multiple access system," *IEEE Trans. on Commun.*, Vol. 44, pp. 84–93, January 1996 [13]; and S. E. Bensley and B. Aazhang, "Subspace-based channel estimation for code division multiple access communication systems," *IEEE Trans. on Commun.*, vol. 44, pp. 1009–1020, August 1996 [14], the contents of which are hereby expressly incorporated by reference. This type of estimator does not need a training sequence and provides good results when unknown information sequences are sent. However, this timing estimator still involves extensive computations due to the need for an eigen decomposition. Also, this technique assumes that the number of active users is fixed and needs to be known or estimated. As a result, there is a need for a system and method for a relatively simple, accurate, and cost effective filtering of an asynchronous wireless signal.

SUMMARY OF THE INVENTION

An adaptive near-far resistant receiver for wireless communication systems, such as, asynchronous DS-CDMA systems is developed without the use of prior synchronization. The only requirement is knowledge of the spreading code of the desired user. Also, there is no need of a training period or of data-free observations.

In one aspect the present system describes a method and system for filtering of an asynchronous wireless signal comprising the steps of receiving a data vector; of using the received data vector to update the weight coefficients of an adaptive filter without prior knowledge of synchronization and without a need for a separate training period or data free observations.

In another aspect, the present system describes an adaptive near-far resistant receiver for an asynchronous wireless system comprising: means for receiving an asynchronous data vector including a spreading code; using the received asynchronous data vector, means for updating weight coefficients of an adaptive filter without prior knowledge of synchronization of the spreading code of the data vector; using the updated weight coefficients, means for determining synchronization of the spreading code; and means for demodulating the output of the filter using the determined synchronization of the spreading code for obtaining a filtered data vector.

In yet another aspect, the present system discloses a method performed by a computer for filtering interference and noise of an asynchronous wireless signal comprising: receiving an asynchronous data vector including a spreading code; using the received asynchronous data vector, updating weight coefficients of an adaptive filter without prior knowledge of synchronization of the spreading code; using the updated weight coefficients information to determine synchronization of the spreading code; and demodulating the output of the filter using the determined synchronization of the spreading code for obtaining a filtered data vector.

The method further comprises the step of dividing the data vector represented by x[i] into two channels $x_1[i]$ and $d_1[i]$ using a transformation $T_1$ on x[i], represented by $T_1x[i]$, wherein the transformed data vector x[i] does not contain information about a designated sender's spreading code $s_1$, and $d_1[i]$ contains primarily only information about the spreading code $s_1$ and residual data from correlation of $s_1$ and x[i].

In yet another aspect, the present system describes an adaptive receiver for filtering interference and noise of an asynchronous wireless signal comprising: means for receiving an asynchronous data vector including information data bits; means for updating weight coefficients of an adaptive filter without prior knowledge of synchronization of the information data bits for determining the start of the information data bits; and means for demodulating the output of the adaptive filter.

BRIEF DESCRIPTION OF DRAWINGS

Other embodiments of the present invention will become readily apparent to those skilled in the art from the following detailed description. As will be realized, the invention is capable of other and different embodiments and its several details are capable of modification in various respects, all without departing from the spirit and scope of the present invention. Accordingly, the drawings and detailed description are to be regarded as illustrative in nature and not as restrictive.

FIG. 6 is an exemplary decomposition of data vectors of FIG. 7;

DETAIL DESCRIPTION

Figure 1:
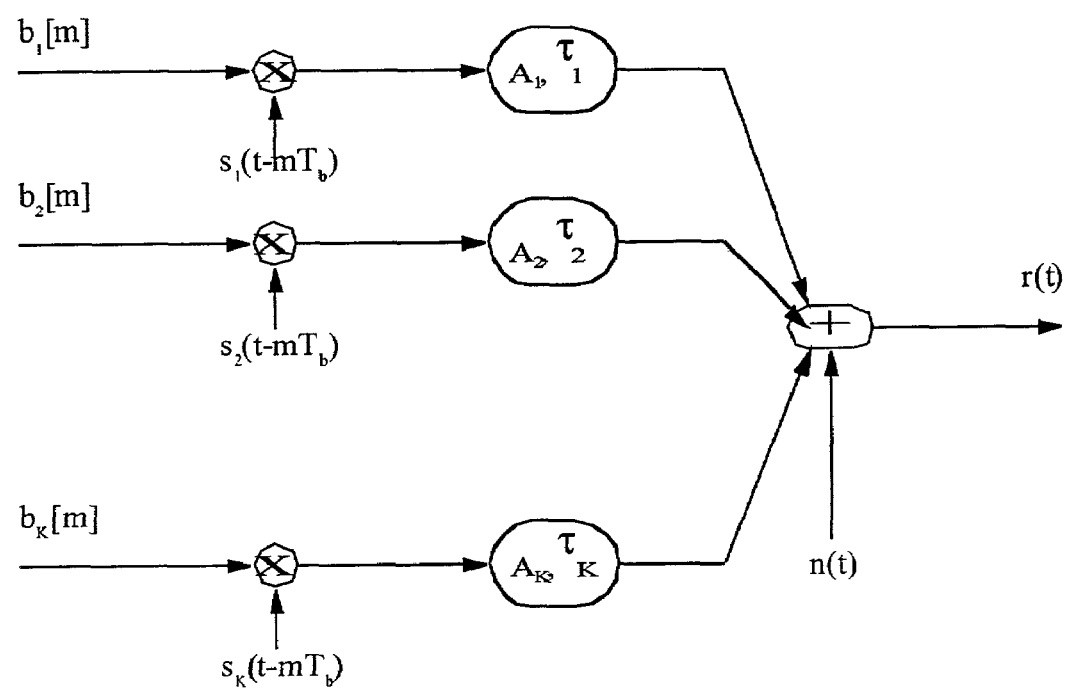
FIG. 1 is an exemplary block diagram of an asynchronous DS-CDMA system.
Figure 1A:
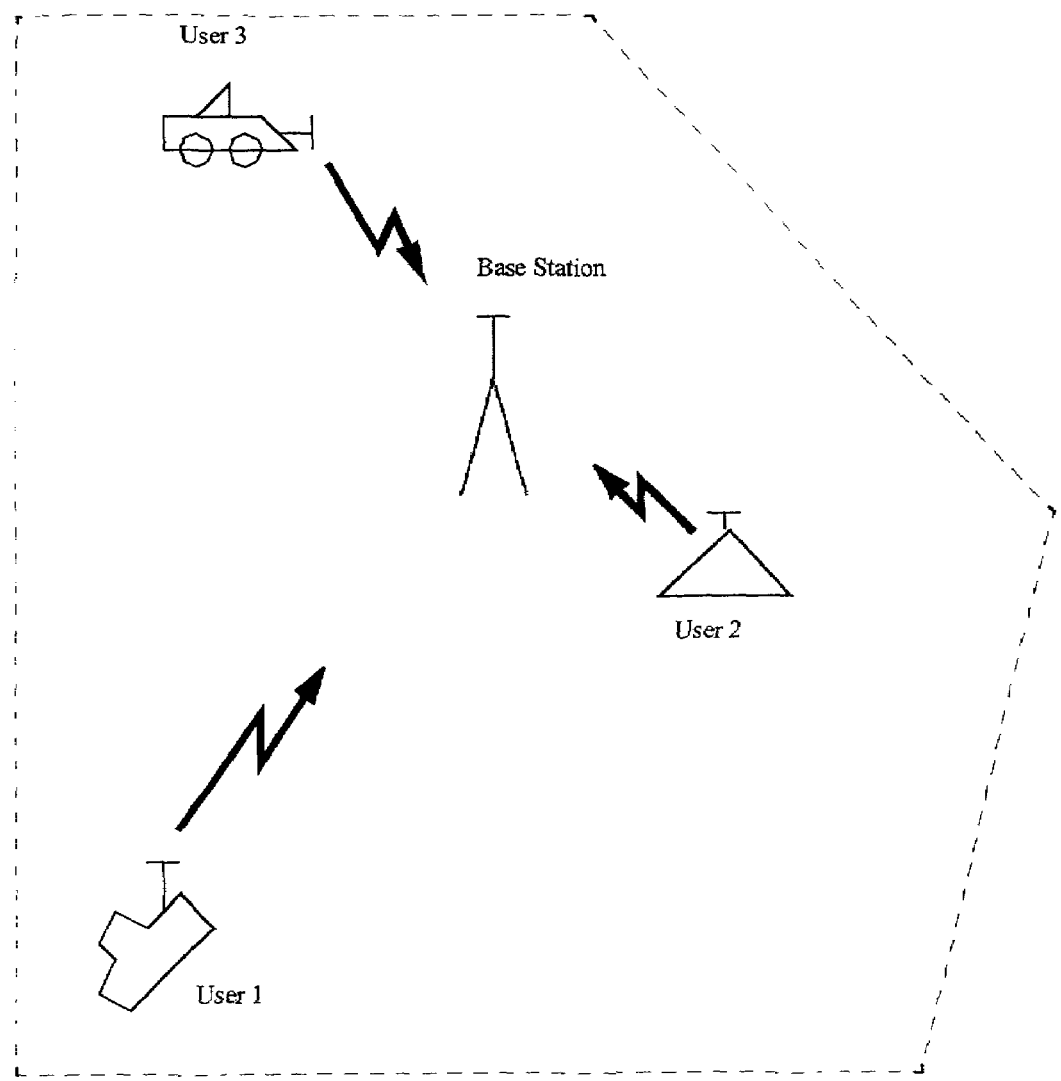
FIG. 1A is an exemplary block diagram of a mobile phone channel.

In this invention, an adaptive near-far resistant receiver for asynchronous DS-CDMA is described which assumes no prior knowledge of synchronization. The receiver of the present invention only needs to have knowledge of the spreading code of the desired user. Also there is no need of a separate training period or of data-free observations. The receiver is composed of a near-far resistant acquisition criterion and demodulation scheme. Furthermore, a lower complexity version of the receiver is developed that is related to the concept of the multistage Wiener filter described in J. S. Goldstein, I. S. Reed, and L. L. Scharf, "A multistage representation of the Wiener filter based on orthogonal projections," *IEEE Trans. Inform. Theory*, vol. 44, pp. 2943–2959, November 1998 [16], the contents of which are hereby expressly incorporated by reference. This results in a substantial reduction of the computational burden and a rapid convergence in an adaptive implementation. Finally, an iterative version of the multistage decomposition is developed.

As shown in L. E. Brennan and I. S. Reed, "A digital adaptive antenna for JTIDS," The final report on contract F19628-88-C-0098, Adaptive Sensors, Inc., December 1989, submitted to the Electronic Systems Division AFSC, USAF [15], the contents of which are hereby expressly incorporated by reference, acquisition is an optimum signal detection problem analogous to radar-signal detection. In [15], the detector of the signal looks at each sampling interval for a new data set of N samples that occur periodically, where N is the spreading gain of the system. This is accomplished by a moving window or its physical realization, using a tapped delay line (TDL). This moving window is used to sweep through each periodic time interval of N samples. In each such time period, an estimate of the timing is obtained from the maximum of a set of optimum adaptive filter outputs. Thus, synchronization can be done sequentially over the code length by the maximum likelihood detector. For demodulation, an adaptive MMSE receiver described in [4] and [7] is implemented. One approach for implementing the receiver is the equivalent of a TDL, finite impulse response (FIR) adaptive filter bank. Such an FIR detector-demodulator adaptive filter bank is converted then to the considerably simpler bank of iterative or infinite impulse response (IIR) filters.

The authors in [16] have developed a new type of reduced-rank adaptive Wiener filter. With the concept of the reduced-rank multistage-Wiener adaptive filter a lower complexity version of the receiver is developed. As a consequence, covariance-matrix inversions or eigen decompositions are avoided, thereby making possible a substantial reduction in computational complexity. The multistage scheme not only eliminates matrix inversions, but its adaptive version which is developed in [7] can be realized directly from the raw A/D converted digital data without any need for an explicit estimation of the covariance matrix. These important features contribute to a significant reduction of the computational cost and the amount of sample support usually required to accurately estimate the covariance matrix, as shown in I. S. Reed, J. D. Mallet, and L. E. Brannan, "Rapid convergence rate in adaptive arrays," *IEEE Trans. Aerosp. Electron. Syst.*, AES-10, pp. 853–863, November 1974 [24], the contents of which are hereby expressly incorporated by reference.

In this invention, a new iterative method or an IIR version of the reduced-rank multistage-Wiener adaptive filter is developed. In this new method, the coefficients of each filter of a filter bank are updated every time that a data vector is received. Thus, each filter continuously keeps track of the changes of the environment. Furthermore, this new algorithm is implemented more efficiently because it obviates the necessity of matrix multiplications. This new algorithm can be realized as an iterative or IIR adaptive filter bank with each filter of the type suggested in [6], whereas the original algorithm in [16] or the training-based algorithm in [7] needs to be realized as an FIR adaptive filter.

For simplicity reasons, only binary phase-shift keying (BPSK) modulation is developed and used in this disclosure, however, it will be recognized by those skilled in the art that other modulation schemes for other embodiments of the invention are also possible. Therefore, the receiver can be applied to many other modulation schemes that utilize other symbol alphabets and spreading-sequence generators. Furthermore, the present invention is not limited by the type of modulation code or the code length of the desired user or of the other users. For example, the family of 4-phase sequence developed in P. V. Kumar, H. F. Francis Lu, T. Helleseth and D.-J. Shin, "On the Large Family of Low Correlation Quaternary Sequences S(2)," *Proceedings of the IEEE Intnl. Conf. Personal Wireless Comm.*, (ICPWC'2000), Hyderbad, pp. 33–37, Dec. 17–20, 2000 [26], the contents of which are hereby expressly incorporated by reference, can also be used as a spreading sequence in addition to the Gold code (described in Appendix A). Synchronization and demodulation of the receiver system is derived in detail in the following sections. The reduced-rank version of the receiver that is based on the multistage representation of the Wiener adaptive filter is also described below.

Asynchronous DS-CDMA System Model

Consider an asynchronous DS-CDMA system that uses BPSK modulation with K simultaneous users on an additive white Gaussian noise (AWGN) baseband channel, as illustrated in FIG. 1. The received signal can be written in the form, $$r(t) = \sum_{m=-\infty}^{\infty} \sum_{k=1}^{K} A_k b_k[m] s_k(t - mT_b - \tau_k) + n(t), \quad (1)$$

where the parameters and other quantities are defined as follows:

$T_b$ Information symbol interval.

$n(t)$ Additive white Gaussian noise (AWGN).

$b_k[m]$ The m-th information symbol of the k-th user and $b_k[m] \in \{-1, 0, 1\}$ where symbol zero denotes the fact that the k-th user is off (has either not started or has finished transmission).

$A_k$ Amplitude of the k-th user.

$\tau_k$ The propagation delay of the k-th user.

Here, $S_k(t)$ is the spreading waveform of the k-th user, given by $$s_k(t) = \sum_{j=0}^{N-1} c_j^{(k)} \phi(t - jT_c), \quad (2)$$

where $T_c$ is the chip interval and $\phi(t)$ is the chip waveform, which is assumed to approximate a rectangular pulse of duration $T_c$. (Each bit in the spreading code is called a chip.) The spreading code waveforms have unit amplitude and are assumed to be periodic with the time period $T_b$. In one symbol period, there are $N=T_b/T_c$ chips, modulated with the spreading code $(C_0^{(k)}, C_1^{(k)}, \ldots, C_{N-1}^{(k)})$. Here, also N is called the spreading gain.

Figures 2A, 2B, 2C, 2D, 2E, 2F:
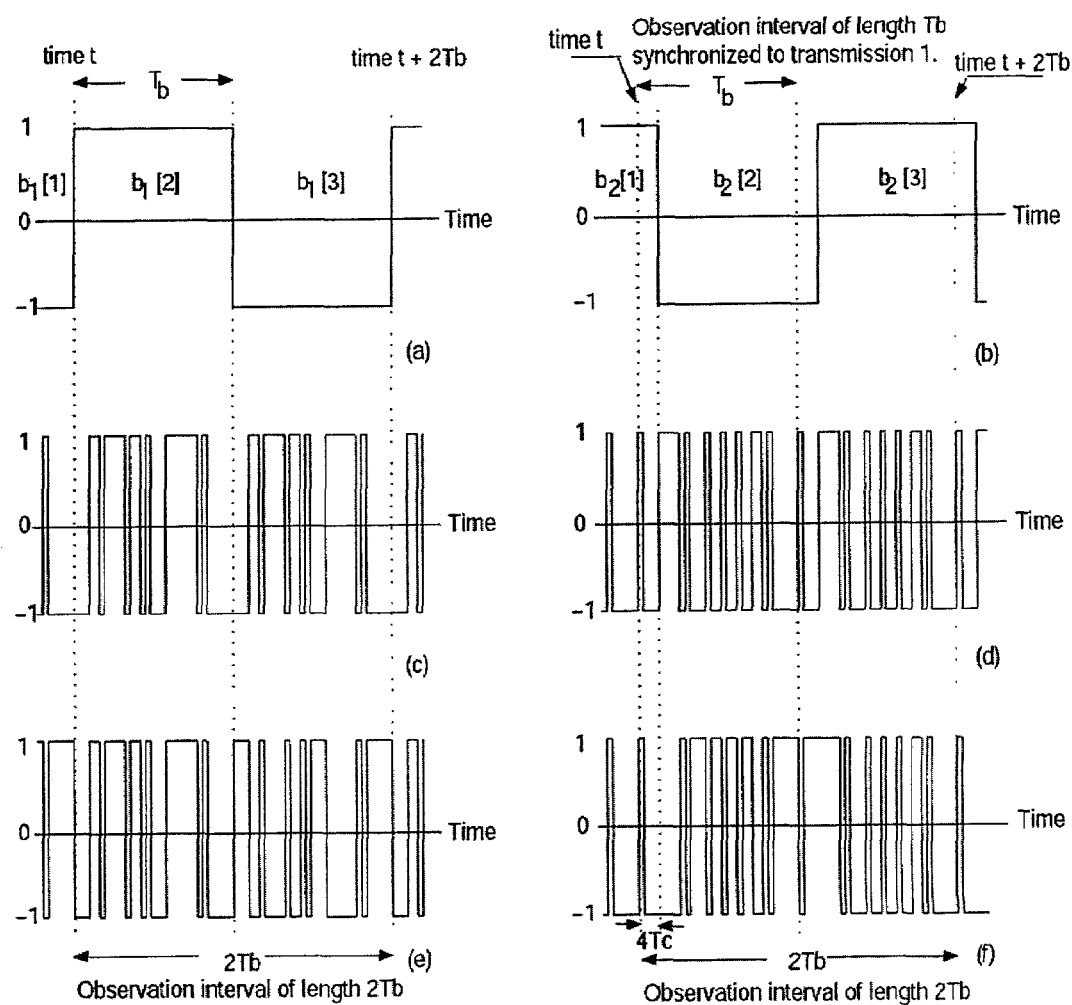
FIGS. 2(*a*)–2(*g*) are exemplary timing diagrams of construction of a typical DS signal.
Figure 2G:
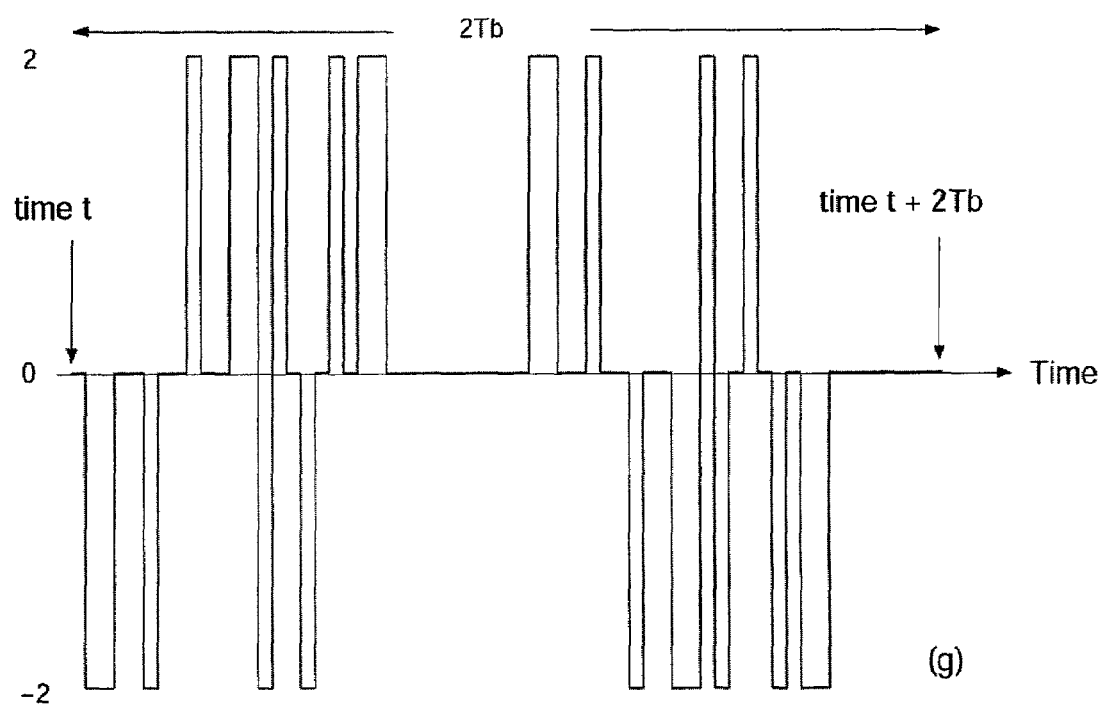

To understand how the asynchronous DS-CDMA signal is determined, an example for K=2 and N=31, is presented next. In the DS-CDMA system, the information-bearing sequence for each user is spread over a broader bandwidth by means of a spreading wave-form that is unique to that user. FIGS. 2(a)–2(g) depict construction of a typical DS signal. FIGS. 2(a) and 2(b) are parts of two information sequences, FIGS. 2(c) and 2(d) are two spreading waveforms, FIGS. 2(e) and 2(f) are the two modulated waveforms to be transmitted, one for the desired user 1 and the other for the interfering user (user 2). FIG. 2(g) is the combined waveform of FIGS. 2(e) and 2(f). Note that user 2 is assumed to be delayed by $\tau_2 - \tau_1 = 4T_c$ seconds with respect to user 1. FIG. 2(a) shows two bits of an information sequence for user 1. The spreading waveform of user 1 is shown in FIG. 2(c). It is constructed by modulating the chip waveform $\phi(t)$ by means of a spreading code. In this example, a Gold code of length 31 is employed for the spreading code of user 1, given by $s_1 = (-1, -1, -1, 1, 1, -1, 1, 1, 1, 1, -1, 1, 1, -1, 1, -1, -1, -1, 1, 1, 1, 1, 1, 1, -1, 1, -1, -1, -1, -1, -1)$ (see Appendix A). Each bit in the spreading code $s_1$ is called a chip. FIG. 2(e) shows the modulated baseband DS signal that corresponds to the multiplication (modulation) of the information sequence and the spreading waveform in FIGS. 2(a) and 2(c). The interfering information signal of user 2 that contributes to the received signal, is assumed to be offset in time from that of user 1 by $4T_c$ and is illustrated in FIG. 2(b). Also, FIGS. 2(d) and (f) show the spreading waveform and the modulated signal of user 2. The spreading code for user 2 is given by $s_2 = (1, 1, 1, 1, -1, 1, -1, -1, -1, 1, -1, -1, 1, -1, -1, 1, -1, -1, 1, -1, -1, -1, -1, -1, 1, -1, -1, -1)$. The baseband transmitted signal for the time interval [t, t+2$T_b$], shown in FIG. 2(g), is the sum of the modulated signals of both users.

To facilitate the derivation of the receiver, the communication channel is assumed to approximate a time-invariant channel over some interval of time exceeding N chips, i.e. the channel is quasi-stationary. In particular, the number, the powers, the delay profiles of the users and the interferers are assumed to be fixed (but unknown). Only the turning on- and-off of the information sequences, their $b_k$'s, and the AWGN are changing in time. In scenarios of this type, it turns out that the receiver is able to adapt quickly to any such changing environment. As a consequence such assumptions affect the usefulness of the receiver of the present invention only minimally.

Figure 3:
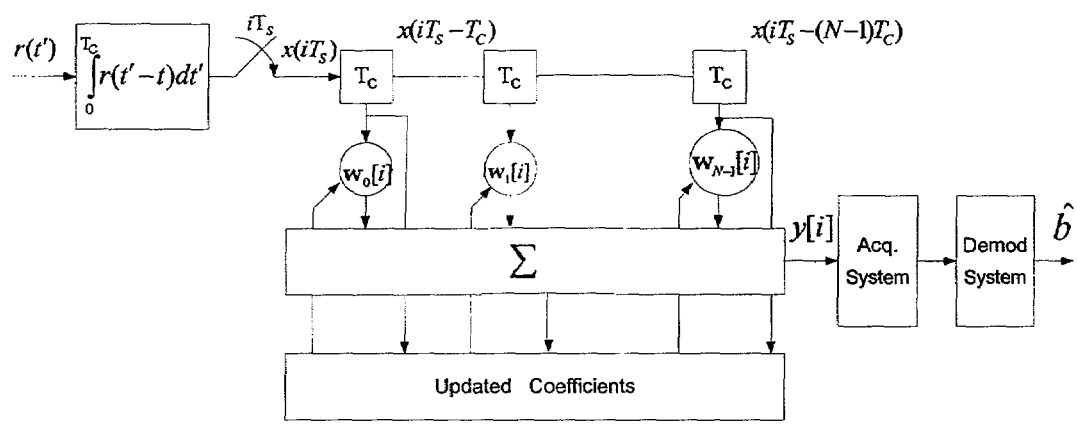
FIG. 3 is an exemplary block diagram of a receiver according to one embodiment of the present invention.

An exemplary receiver structure is shown in FIG. 3. For simplicity in its realization, the proposed receiver is described using a baseband-equivalent structure. Such a baseband complex signal process is physically achieved by the combination of quadrature demodulation and a phase-locked loop (PLL). (For example, see J. G. Proakis, *Digital Communications*, McGraw-Hill, New York, N.Y., 3$^{rd}$ edition, 1995, Chapter 6 [25], the contents of which are hereby expressly incorporated by reference). This converts the received radio frequency (RF) modulated signal to a baseband complex-valued signal. This means that after converting the received signal to baseband complex-valued signals, the received signal is passed through a filter that is matched to the square-wave chip (or other type of waveform that is used to be the chip waveform). The output of this chip matched filter is $$x(t) = \int_{t}^{t+T_c} r(t')dt' = \int_{0}^{T_c} r(t'-t)dt'. \qquad (3)$$

After that the output of the chip matched filter is sampled once every $T_s$ seconds, where $S = T_c/T_s$ is an integer and $S \geq 1$. This means, that the sampling rate is greater than or equal to the chip rate. Then the output is used as the input to the N-element tapped delay line (TDL). The signal is sampled at time $iT_s$ so that the tapped delay line can be expressed by the column vector, $$x[i] = [x(iT_s), x(iT_s - T_c), \ldots, x(iT_s - (N-1)T_c)]^T, \qquad (4)$$

where $[.]^T$ denotes matrix transpose. Similarly the tap-weights' vector is expressed as the column vector, $$w[i] = [w_0[i], w_1[i], \ldots, w_{N-1}[i]]^T. \qquad (5)$$

The components of the weight vector $w[i]$ are determined later in Eq. (30) of Section 3.1.

The output of the tapped delay line filter, $y[i]$, is given by the inner product of the vectors in Eqs. (4) and (5) as follows:

$$y[i] = w[i]^\dagger x[i] = \sum_{n=0}^{N-1} \omega_n[i]^* x(iT_s - T_c + mT_b), \qquad (6)$$

where $[.]^\dagger$ denotes the conjugate (Hermitian) transpose of a matrix, and $[.]^*$ denotes the conjugate of a complex number. This output is passed through the time acquisition and demodulation system to obtain the information bit after synchronization. This time acquisition system can be modeled as a filter bank constructed of NS parallel receivers, each of the type shown in FIG. 3, in order to identify the time phases at which to demodulate the information symbols of the desired user.

Receiver Structure, Synchronization System

As shown in [15], the synchronization problem in communications is a signal detection problem analogous to radar detection. This problem can be modeled as a binary hypothesis problem, where hypothesis $H_1$ corresponds to target signal presence, and hypothesis $H_0$ corresponds to target-signal absence. Thus at each time sample of the N-vector $x[i]$ the synchronization receiver need to distinguish between two hypotheses of some user, say user 1. The target signal under hypothesis $H_1$ is denoted by the N-vector $A_1 b_1 s_1$, where $A_1$ is the amplitude of user 1, $b_1$ is the information bit of user 1, and $$s_1 = [c_0^{(1)}, c_1^{(1)}, \ldots, c_{N-1}^{(1)}]^T$$

is the signature sequence of user 1, where the observation vector at the sample time $iT_s$ is the N-vector $x[i]$, given in Eq. (4).

The noise environment is composed of N-vectors that are due to the combined effects of the interference sources and white noise. The noise process $n(t)$ is assumed to approximate complex Gaussian noise with zero mean by an application of the central limit theorem [11] and a covariance matrix, defined as follows:

$$R_n[i] = E\{n[i]n^{\dagger[i]}\} \quad (7)$$

Thus, at a particular symbol interval the two hypotheses, which the adaptive detector need to distinguish at each sampling time, are given by $H_0: x[i]=n[i]$, $H_1: x[i]=A_1 b_1 s_1 + n[i]$.

given $b_1$ where $b_1=+1$ or $-1$. Note that the condition $b_1=0$, $x[i]$ is equivalent to the null hypothesis $H_0$.

For simplicity, let $N=T_b/T_c$ and $S=T_c/T_s$, where both numbers are integers. If the spreading code modulation is approximately band-limited, the case $S=2$ would correspond with Nyquist sampling. It is easy to show that the covariance matrix of the sample vector $x[i]$ is periodic with the integer time period NS. In other words, $x[i]$ is a cyclostationary process with period NS.

The random vector $x[i]$, when conditioned on the first user's information symbol $b_1$, is approximately Gaussian under both hypotheses. The condition probability densities of $x[i]$ are $$p(x[i] | H_1, b_1) = \frac{1}{\pi^N \det(R_n[i])} e^{-(x[i]-A_1 b_1 s_1)^\dagger R_n^{-1}[i](x[i]-A_1 b_1 s_1)} \quad (8)$$

$$p(x[i] | H_0) = \frac{1}{\pi^N \det(R_n[i])} e^{-x^\dagger[i] R_n^{-1}[i] x[i]},$$

where $\det(R)$ denotes the determinant of $R$. From Eq. (8), the conditional probability density of $p(x[i]|H_1,b_1)$ can be expressed in terms of $p(x[i]|H_1,b_1)$ for $b_1=\pm 1$ as follows:

$$p(x[i]|H_1) = \sum_{b_1} p(b_1) \cdot p(x[i] | H_1, b_1), \quad (9)$$

where $p(b_1=1)=p(b_1=-1)=1/2$. Then, the likelihood-ratio test (LRT) takes the form, $$\Lambda = \frac{p(x[i]|H_1)}{p(x[i]|H_0)} \underset{H_0}{\overset{H_1}{\gtreqless}} \gamma, \quad (10)$$

where $\gamma$ is the detection threshold. The substitution of the conditional probability density functions, given in Eq. (9), into Eq. (10) yields:

$$\Lambda = \frac{1}{2}\left(\frac{p(x[i]|H_1, b_1=1) + p(x[i]|H_1, b_1=-1)}{p(x[i]|H_0)}\right) \quad (11)$$

$$= \frac{e^{-(A_1 s_1)^\dagger R_n^{-1}[i](A_1 s_1)}\left[e^{-2\text{Re}\{(A_1 s_1)^\dagger R_n^{-1}[i] x[i]\}} + e^{2\text{Re}\{(A_1 s_1)^\dagger R_n^{-1}[i] x[i]\}}\right]}{2}.$$

Thus, the likelihood ratio test in Eq. (10) reduces to $$\Lambda = \cosh(2\text{Re}\{(A_1 b_1 s_1)^\dagger R_n^{-1}[i] x[i]\}) \underset{H_0}{\overset{H_1}{\gtreqless}} \gamma_1, \quad (12)$$

where $\gamma_1$ is a new decision constant. Since the hyperbolic cosine function $\cosh(.)$ is a monotonically increasing function in the magnitude of its argument, the test in Eq. (12) is clearly equivalent to $$|\text{Re}\{q[i]\}| = \left|\text{Re}\{s_1^\dagger R_n^{-1}[i] x[i]\}\right| \underset{H_0}{\overset{H_1}{\gtreqless}} \gamma_2, \quad (13a)$$

where $$q[i] = s_1^\dagger R_n^{-1}[i] x[i], \quad (13b)$$

and $\gamma_2$ is another constant.

The test statistic in Eq. (13a) can be used at each clock time or phase within the time period $NT_c$ to test for the existence of the signal of a particular user, If $$Q[i] = \{|\text{Re}\{q[i]\}|, \ldots, |\text{Re}\{q[i-NS+1]\}|\} \quad (14)$$

is the set of such tests in increasing time sequence of the form, given in Eq. (13a) over a past spreading code period total of NS clock times, then the integer clock time $\hat{i} \in \{i, i-1, \ldots, i-NS+1\}$, such that $$|\text{Re}\{q[\hat{i}]\}| = \max_{k \in \{0,1,\ldots,NS-1\}} |\text{Re}\{q[i-k]\}| \quad (15)$$

is attained, is the time that synchronization is most likely to occur within the interval (i−NS+1, i). The "greatest of" sequence-in-time test in Eq. (15) detects sequentially the maximum of all likelihood tests in the filter bank of the tests in the set Q [i] in Eq. (14).

The matrix $R_n[i]$ in Eqs. (13a) and (13b) is the covariance matrix of the signal-free observation N-vector $x[i]=n[i]$. In the classical adaptive-array application it is normally possible to collect signal-free observation vectors. However, in a CDMA-type system, obtaining signal-free observation vectors at the receiver is not at all a trivial task. The test in Eq. (13a) needs to be considerably modified in order to be realized with both signal-plus-noise and noise-only data vectors.

To accomplish this modification test in Eq. (13a) is expressed equivalently next in, what is called, the generalized sidelobe canceler (GSC) form. Consider an N×N nonsingular matrix $T_1$ with the structure, $$T_1 = \begin{bmatrix} u_1^\dagger \\ B_1 \end{bmatrix}, \quad (16)$$

where $B_1$ is, what is called, a blocking matrix whose rows are composed of any orthonormal basis set of the nullspace of the normalized signal vector $$u_1 = s_1 / \sqrt{s_1^\dagger s_1}.$$

That is, $$B_1 u_1 = B_1 s_1 = 0. \quad (17)$$

The test statistic in Eq. (13a) can be re-expressed in terms of the transformation $T_1$, defined in Eqs. (16) and (17) as the expression, $$|\text{Re}\{s_1^\dagger R_n^{-1}[i]x[i]\}| = |\text{Re}\{s_1^\dagger T_1^\dagger (T_1 R_n[i]T_1^\dagger)^{-1} T_1 x[i]\}|. \quad (18)$$

To evaluate the latter test statistic in Eq. (13a), let the transformed output vector be expressed in the form, $$T_1 x[i] = \begin{bmatrix} u_1^\dagger x[i] \\ B_1 x[i] \end{bmatrix} = \begin{bmatrix} d_1[i] \\ x_1[i] \end{bmatrix}, \quad (19)$$

where $$d_1[i] = u_1^\dagger x[i]$$

is a signal-plus-noise scalar process and $x_1[i] = B_1 x[i]$, is an (N−1)-dimensional process with the signal removed.

Figure 4:
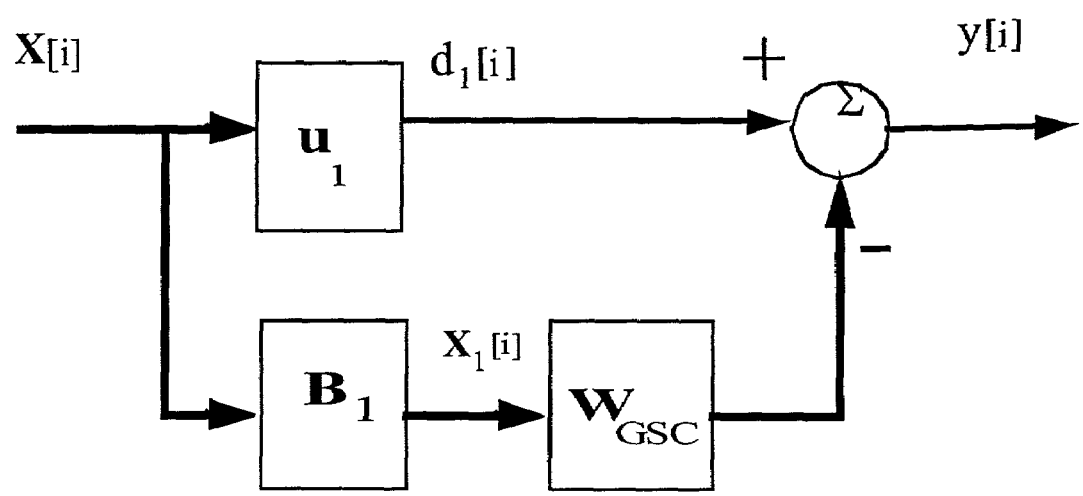
FIG. 4 is an exemplary block diagram of a structure of a test statistic.

Here, the data vector $x[i]$ is divided by the transformation $T_1$ into two channels or paths, namely, $d_1[i]$ and $x_1[i]$, respectively, as shown in FIG. 4. The transformed data vector $x_1[i]$ does not contain any information about the signal $s_1$ because it was obtained by a projection of the data onto the orthogonal complement of the signal subspace. Actually, in the channel of the $d_1[i]$ process, obtained when the data vector $x[i]$ is projected onto the signal subspace, the interference has been suppressed already due to the low cross-correlation property of the other users' spreading codes. This $d_1[i]$ process is the same process that is obtained from the cross-correlation conventional detector which yields for low interference level an acceptable performance by the exploitation of this property. However, with severe MAI due to the near-far problem, it is possible that the contribution of the interference in the $d_1[i]$ channel is still significant. Thus, the other channel $x_1[i]$ which contains information only about the interference-plus-noise can be used to partially cancel the interference-plus-noise process in the $d_1[i]$ channel. Then the herein described multistage decomposition for a Wiener filter provides a natural and optimal way to accomplish such a step-by-step cancellation process.

The correlation matrix of the transformed vector $T_1 x[i]$ can be expressed as the following partitioned matrix:

$$T_1 R_x[i] T_1^\dagger = \begin{bmatrix} u_1^\dagger R_x[i] u_1 & u_1^\dagger R_x[i] B_1^\dagger \\ B_1 R_x[i] u_1 & B_1 R_x[i] B_1^\dagger \end{bmatrix} = \begin{bmatrix} \sigma_{d_1}^2[i] & r_{x_1 d_1}^\dagger[i] \\ r_{x_1 d_1}[i] & R_{x_1}[i] \end{bmatrix}, \quad (20)$$

where, $$\sigma_{d_1}^2[i] = u_1^\dagger R_x[i] u_1 = E\{|d_1[i]|^2\}, \quad (21)$$

$$r_{x_1 d_1}[i] = B_1 R_x[i] u_1 = E\{x_1[i] d_1^*[i]\}, \quad (22)$$

$$R_{x_1}[i] = B_1 R_x[i] B_1^\dagger, \quad (23)$$

with $E\{.\}$ denoting the expected value operator. Next the signal-free correlation matrix $R_n[i]$, needed in Eq. (13a), can be expressed in terms of $R_x[i]$ by $$R_n[i] = R_x[i] - A_1^2 s_1 s_1^\dagger, \quad (23a)$$

where $$s_1 s_1^\dagger$$

is the N×N matri outer product of vector $s_1$ by itself. If one defines the positive number, $$\delta_1 = \sqrt{s_1^\dagger s_1},$$

it can be shown, using Eq. (23a), that $$T_1 R_n[i] T_1^\dagger = \begin{bmatrix} u_1^\dagger R_n[i] u_1 & u_1^\dagger R_n[i] B_1^\dagger \\ B_1 R_n[i] u_1 & B_1 R_n[i] B_1^\dagger \end{bmatrix} = \begin{bmatrix} \sigma_{d_1}^2[i] + A_1^2 \delta_1^2 & r_{x_1 d_1}^\dagger[i] \\ r_{x_1 d_1}[i] & R_{x_1}[i] \end{bmatrix}, \quad (23b)$$

With the aid of the matrix inversion lemma in Jerry M. Mendel, *Lessons in Estimation Theory for Signal Processing, Communications, and Control,* Prentice-Hall, Englewood Cliffs, N.J., 1995 [17], the contents of which are hereby expressly incorporated by reference, the inverse of $$T_1 R_n[i] T_1^\dagger$$

is computed to be $$(T_1 R_n[i] T_1^\dagger)^{-1} = (\xi_1[i] + A_1^2 \delta_1^2)^{-1} \begin{bmatrix} 1 & r_{x_1 d_1}^\dagger[i] R_{x_1}^{-1}[i] \\ -R_{x_1}^{-1}[i] r_{x_1 d_1}[i] & R_{x_1}^{-1}[i]((\xi_1[i] + A_1^2 \delta_1^2)I + r_{x_1 d_1}[i] r_{x_1 d_1}^\dagger[i] R_{x_1}^{-1}[i]) \end{bmatrix}, \quad (24)$$

where $$\xi_1[i] = \sigma_{d_1}^2[i] - r_{x_1 d_1}^\dagger[i] R_{x_1}^{-1}[i] r_{x_1 d_1}[i]. \quad (25)$$

Then, the transformed signal $T_1s_1$ is given by the vector, $$T_1s_1 = \left[\sqrt{(s_1^\dagger s_1)} \; 0 \; \ldots \; 0\right]^\dagger = \delta_1[1 \; 0 \; \ldots \; 0]^\dagger, \quad (27)$$

Hence, the test statistic in Eq. (13a) can be re-expressed as $$\left|\text{Re}\{s_1^\dagger R_n^{-1}[i]x[i]\}\right| = \left|\text{Re}\{s_1^\dagger T_1^\dagger (T_1 R_n[i] T_1^\dagger)^{-1} T_1 x[i]\}\right| \quad (28)$$
$$= \left|\text{Re}\{(\xi_1[i] + A_1^2\delta_1^2)^{-1}\delta_1^*(u_1^\dagger - w_{GSC}^\dagger[i]B_1)x[i]\}\right|,$$

where, $$w_{GSC}^\dagger[i] = r_{x_1 d_1}^\dagger[i]R_{x_1}^{-1}[i]. \quad (29)$$

From Eq. (28) the term $\delta_1$ is a positive constant which can be moved to the other side of the test in Eq. (13a). Also the term $$(\xi_1[i] + A_1^2\delta_1^2)^{-1}$$

defined in Eq. (26), does not vary significantly over the period NS when the signal $A_1s_1$ is comparable to the interference-plus-noise power level so that $$(\xi_1[i] + A_1^2\delta_1^2)^{-1}$$

is approximately a positive constant over the same NS time period. Hence also the term $$(\xi_1[i] + A_1^2\delta_1^2)^{-1}$$

can be moved to the other side of the test in Eq. (13a). Thus the test statistic q[i] in Eq. (13a) can be modified to a new test statistic y[i] given as follows:

$$|\text{Re}\{y[i]\}| = \left|\text{Re}\{(u_1^\dagger - w_{GSC}^\dagger[i]B_1)x[i]\}\right| \underset{H_0}{\overset{H_1}{\gtrless}} \gamma_2, \quad (30)$$

where the weight vector in Eq. (5) has been replaced by $$u_1^\dagger - w_{GSC}^\dagger[i]B_1, \quad (30a)$$

and y[i] which replaces q[i] in Eqs.(14) and (15) is defined by the modified likelihood ratio test $$y[i] = (u_1^\dagger - w_{GSC}^\dagger[i]B_1)x[i]. \quad (30b)$$

The block-diagram structure of this new test statistic is shown in FIG. 4. Evidently, this test statistic has the form of the classical sidelobe canceler, used in the past to suppress or cancel interferers or jamming of radars and communication systems. Also note that the modified test to determine $\hat{i}$ for synchronization in Eq. (15) is given by $$\left|\text{Re}\{y[\hat{i}]\}\right| = \max_{k \in (0,1,\ldots,NS-1)} \left|\text{Re}\{y[i-k]\}\right| \quad (30c)$$

with q[i] replaced by y[i] in Eq. (30b).

From the test statistic in Eq. (30) the expression $W_{GSC}$ is the only term to utilize the covariance matrix. It is easily verifiable that $$R_{x_1}[i] = B_1 R_n[i]B_1^\dagger = B_1(R_x[i] - A_1^2 s_1 s_1^\dagger)B_1^\dagger = B_1 R_x[i]B_1^\dagger, \quad (31)$$

$$r_{x_1 d_1}[i] = B_1 R_n[i]s_1 = B_1(R_x[i] - A_1^2 s_1 s_1^\dagger)s_1 = B_1 R_x[i]s_1. \quad (32)$$

These relations in Eqs. (31) and (32) demonstrate that the test statistic in Eq. (30) remains invariant to the presence or absence of a signal component in the observation vector x[i].

Demodulation System

Once synchronization is established, data demodulation is accomplished by the use of a MMSE detector [4, 5]. Let $x[\hat{i}]$, where $\hat{i}$ is the time phase or clock time defined in Eq. (15) at which synchronization occurs, be the observation vector obtained upon synchronization. Then, the estimate of the information symbol $b_1$ is obtained from the estimation statistic in Eq. (30) has the form, $$\hat{b}_1 = \text{sgn}(\text{Re}\{(A_1 s_1)^\dagger R_x^{-1}[\hat{i}]x[\hat{i}]\}), \quad (33)$$

where sgn denotes the sign operator. Since the amplitude $A_1$ and the norm of the signal sequence, namely $$\sqrt{s_1^\dagger s_1}$$

is positive, the estimate of $b_1$ can be simplified to $$\hat{b}_1 = \text{sgn}(\text{Re}\{u_1^\dagger R_x^{-1}[\hat{i}]x[\hat{i}]\}). \quad (34)$$

However, for the modified test statistic in FIG. 4, the estimate of $b_1$ is obtained by replacing the weight vector $u_1^\dagger R_x^{-1}[\hat{i}]$ in Eq. (34) by the new weight vector in Eq. (30). Thus $$\hat{b}_1 = \text{sgn}(\text{Re}\{(u_1^\dagger - w_{GSC}^\dagger[\hat{i}]B_1)x[\hat{i}]\}). \quad (35)$$

is the modified estimate of the information symbol to use hereafter in this invention. It should be noted that the term $$(u_1^\dagger - w_{GSC}^\dagger[\hat{i}]B_1)x[\hat{i}]$$

is used in common with both the synchronization system and the demodulation system. This term can be computed and stored during the acquisition process. It does not need to be recomputed for demodulation.

An Exemplary Implementation of the Receiver

Recall that $x^{(m)}[i]$ is the observation vector at the sampling time $iT_s$ of the m-th symbol. Assume that L approximately independent snapshots (samples) of the observation vector $x^{(m)}[i]$ are available for the initial acquisition of the detector parameters. These data are given in matrix form by $$X_0[i] \triangleq [x^{(1)}[i], \ldots, x^{(L)}[i]].$$

The maximum likelihood estimator for $R_x[i]$ is computed then to be $$\hat{R}_x[i] = \frac{1}{L} \sum_{m=1}^{L} x^{(m)}[i]x^{(m)*}[i] = \frac{1}{L} X_0[i]X_0^\dagger[i].$$

The two statistics needed to find $w_{GSC}$ can be computed by the following:

$$\hat{R}_{x_1}[i] = B_1 \hat{R}_{x_1}[i] B_1^\dagger = \frac{1}{L} B_1 X_0[i]X_0^\dagger[i]B_1^\dagger$$

$$\hat{r}_{x_1 d_1} = B_1 \hat{R}_x[i]s_1 = \frac{1}{L} B_1 X_0[i]X_0^\dagger[i]s_1$$

By substitution of these two estimates into Eqs.(30) and (35), an adaptive version of the proposed receiver is obtained.

Lower Complexity with the Multistage Representation

Recently, rank-reduction methods have received considerable attention in the context of a Wiener filter [16] and in J. S. Goldstein and I. S. Reed, "Reduced-rank adaptive filtering," *IEEE Trans. Signal Processing*, vol. 45, pp. 492–496, February 1997 [18], the contents of which are hereby expressly incorporated by reference, in which form the detection tests in Eqs.(30) and (35) can be applied. To achieve this, the observation vector is projected onto a lower dimensional subspace, and the Wiener filter is constrained to lie in this subspace. This procedure makes possible optimal signal detection and accurate signal estimation while allowing for a lower computational complexity and a smaller sample support.

In this section a reduced-rank version of the receiver is developed which is based on a new Wiener filter structure, called "multistage representation of the Wiener filter," [16]. This multistage structure represents a pioneering breakthrough in that it achieves near full rank detection and estimation performance with often only a small number of stages. This can result in a substantial reduction of the computational burden and a rapid convergence in an adaptive implementation without any need for matrix inversion.

To achieve the desired multistage decomposition of the likelihood ratio test in Eq. (13a), successive orthogonal decompositions are applied to the observed data. Actually, the derivation of the test in Eq. (30) from Eq. (13a) can be considered to be the first stage of the multistage decomposition. To accomplish the second stage of the decomposition, the same technique is applied to the term $x_1[i]=B_1x[i]$ and $w_{GSC}$ defined in Eq. (29). First, define $u_2[i]$ as the vector, $$u_2[i] \triangleq \frac{r_{x_1 d_1}[i]}{\sqrt{r_{x_1 d_1}^\dagger[i] r_{x_1 d_1}[i]}}, \tag{36}$$

where, $r_{x_1 d_1}[i]$ is the correlation defined in Eq. (22). Then, define a new nonsingular trans-formation $T_2[i]$, similar to $T_1$ in (16), by $$T_2[i] = \begin{bmatrix} u_2^\dagger[i] \\ B_2[i] \end{bmatrix}, \tag{37}$$

where the rows of the (N−2)×N matrix $B_2[i]$ is the null space of $u_2[i]$, i.e., $B_2[i]u_2[i]=0$. Thus, the new transformed vector under transformation $T_2[i]$ is represented by $$T_2[i]x_1[i] = \begin{bmatrix} u_2^\dagger[i]x_1[i] \\ B_2[i]x_1[i] \end{bmatrix} = \begin{bmatrix} d_2[i] \\ B_2[i] \end{bmatrix} \tag{38}$$

in accordance with the definition in Eq. (19) for the first stage decomposition. The procedure for the decomposition of the likelihood ratio test in the first stage is repeated in the second stage. By following the same arguments that lead to Eqs. (28) and (29), the second stage decomposition of the likelihood ratio is calculated from Eq. (28) by the relations $$y[i] = (u_1^\dagger - w_{GSC}^\dagger[i]B_1)x[i] \tag{39}$$

$$= (u_1^\dagger - \omega_2^*[i](u_2^\dagger[i] - r_{x_2 d_2}^\dagger[i]R_{x_2}^{-1}[i]B_2[i])x[i])$$

$$= d_1[i] - \omega_2^*[i](d_2[i] - r_{x_2 d_2}^\dagger[i]R_{x_2}^{-1}[i]x_2[i]),$$

where $$\omega_2[i] \triangleq \frac{\delta_2[i]}{\xi_2[i]},$$

$$\delta_2[i] = \sqrt{r_{x_1 d_1}^\dagger[i] r_{x_1 d_1}[i]} \text{ and } \xi_2[i] = \sigma_{d_2}^2[i] - r_{x_2 d_2}^\dagger[i]R_{x_2}^{-1}[i]r_{x_2 d_2}[i].$$

Also, define an error signal $\epsilon_2[i]$ as $$\epsilon_2[i] = d_2[i] - r_{x_2 d_2}^\dagger[i]R_{x_2}^{-1}[i]x_2[i]. \tag{40}$$

The variance of $\epsilon_2[i]$ in Eq. (40) is given by $$\sigma_{\epsilon_2}^2[i] = E\{\epsilon_2[i]\epsilon_2^*[i]\}. \qquad (41)$$

Thus, the substitution of Eq. (40) into Eq. (41) yields:

$$\begin{aligned}\sigma_{\epsilon_2}^2[i] &= E\{(d_2[i] - r_{x_2 d_2}^\dagger[i]R_{x_2}^{-1}[i]x_2[i])(d_2[i] - r_{x_2 d_2}^\dagger[i]R_{x_2}^{-1}[i]x_2[i])^\dagger\} \\ &= \sigma_{d_2}^2[i] - 2r_{x_2 d_2}^\dagger[i]R_{x_2}^{-1}[i]r_{x_2 d_2}[i] + r_{x_2 d_2}^\dagger[i]R_{x_2}^{-1}[i]R_{x_2}[i]R_{x_2}^{-1}[i]r_{x_2 d_2}[i] \\ &= \sigma_{d_2}^2[i] - r_{x_2 d_2}^\dagger[i]R_{x_2}^{-1}[i]r_{x_2 d_2}[i] = \xi_2[i].\end{aligned} \qquad (42)$$

Recall from Eq. (25) that $$\xi_1[i] = \sigma_{d_2}^2[i] - r_{x_2 d_2}^\dagger[i]R_{x_2}^{-1}[i]r_{x_2 d_2}[i] = \sigma_{\epsilon_1}^2[i],$$

where $\epsilon_1[i]=d_1[i]-r_{x_1 d_1}^\dagger[i]R_{x_1}^{-1}[i]x_1[i]$ is defined similarly to $\epsilon_2[i]$ in Eq. (40). From Eqs. (39) and (40), one obtains the relation $$\epsilon_1[i] = y[i] = d_1[i] - \omega_2^*[i]\epsilon_2[i], \qquad (43)$$

between $\epsilon_1[i]$ and $\epsilon_2[i]$. Hence the variance $\xi_1[i]$ in Eq. (25) can be expressed further by $$\begin{aligned}\xi_1[i] &= \sigma_{d_1}^2[i] - r_{x_1 d_1}^\dagger[i]T_2^\dagger(T_2 R_{x_1}[i]T_2^\dagger)^{-1}T_2 r_{x_1 d_1}[i] \\ &= \sigma_{d_1}^2[i] - \xi_2^{-1}[i]\delta_2^2[i],\end{aligned} \qquad (44)$$

thereby directly relating the variance $\xi_1[i]$ with the corresponding variance $\xi_2[i]$ of the second stage of the multistage decomposition.

A continuation of this decomposition process, extending Eq. (39), yields the N-stage likelihood ratio test in terms of only scalar quantities in recursive form as follows:

$$y[i]=d_1[i]-\omega_2^*[i](d_2[i]-\omega_3^*[i](\ldots \omega_{N-1}^*[i](d_{N-1}[i]-\omega_N^*[i]d_N[i])\ldots)). \qquad (45)$$

More complete details of the multistage decomposition are developed in [16]; and J. S. Goldstein, I. S. Reed, and P. A. Zulch, "Multistage partially adaptive STAP CFAR detection algorithm," *IEEE Trans. Aerosp. Electron. Syst.*, vol. 35, pp. 645–661, April 1999 [19], the contents of which are hereby expressly incorporated by reference.

Rank reduction is realized as a truncation of the full-scale structure of the formula in Eq. (45) at the M-th stage, where M<N. That is, the rank-M detector is obtained by stopping the decomposition at stage M, i.e. by setting $B_M[i]=0$. As consequence, $\epsilon_M[i]=d_M[i]$ and $$\xi_M[i] = \sigma_{\epsilon_M}^2[i] = \sigma_{d_M}^2[i].$$

Figure 5:
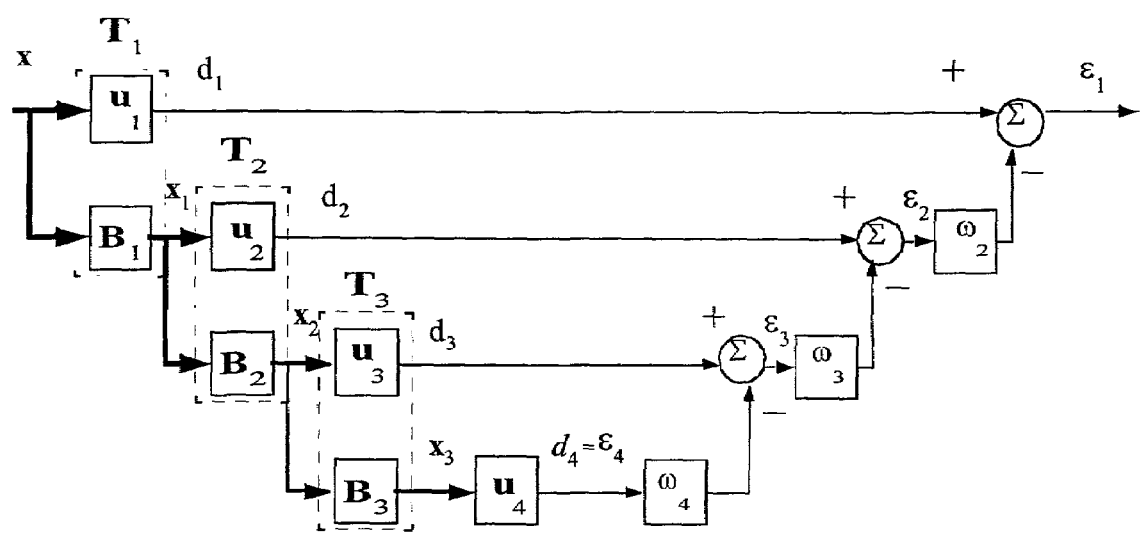
FIG. 5 is an exemplary block diagram of a multistage decomposition of a likelihood ratio test for M=4.

The complete recursion procedure for the rank-M version of the likelihood ratio test in Eq. (13a) is summarized in Table 1 as a pseudocode (also given in [16] and FIG. 5). The exemplary block diagram of FIG. 5 illustrates the likelihood ratio test for M=4.

Table 1 shows recursion formulas for the reduced-rank likelihood ratio test.

TABLE 1

Initialization:

$$u_1 = \frac{s_1}{\|s_1\|}, \quad B_1 = \text{null}(u_1), \quad x_0[i] = x[i]$$

Forward Recursion

For j = 1 to M − 1

$$d_j[i] = u_j^\dagger[i]x_{j-1}[i]$$
$$x_j[i] = B_j[i]x_{j-1}[i]$$
$$r_{x_j d_j}[i] = E\{x_j[i]d_j^*[i]\}$$
$$\delta_{j+1}[i] = \|r_{x_j d_j}[i]\|$$
$$u_{j+1}[i] = \frac{r_{x_j d_j}[i]}{\|r_{x_j d_j}[i]\|} = \frac{r_{x_j d_j}[i]}{\delta_{j+1}[i]}$$
$$B_{j+1}[i] = \text{null}(u_{j+1}[i])$$

End

Define $x_{M-1}[i] = d_M[i] = \epsilon_M[i]$

Backward Recursion $$\sigma_{d_M}^2[i] = E\{\|d_M[i]\|^2\}$$
$$\xi_M[i] = \sigma_{d_M}^2[i], \quad \omega_M[i] = \xi_M^{-1}[i]\delta_M[i].$$

For j = M − 1 to 2

$$\sigma_{d_j}^2[i] = E\{\|d_j[i]\|^2\}$$
$$\xi_j[i] = \sigma_{d_j}^2[i] - \xi_{j+1}^{-1}[i]\delta_{j+1}^2[i]$$
$$\omega_j[i] = \xi_j^{-1}[i]\delta_j[i]$$

End

Adaptive Realization of the Multistage Decomposition of the Test

Usually, the covariance matrix for an adaptive filter is not known a priori with any certainty. Thus to perform the detection test in Eq. (30), it is necessary to find a statistical estimate $\hat{R}_x[i]$ to substitute for $R_x[i]$. In addition, the inversion of $\hat{R}_x[i]$ is needed for each $iT_s$ where $0 \le i \le NS-1$. This involves high computational complexity, and it is not a trivial task to accomplish.

However, the multistage structure that is introduced in the previous section not only eliminates the task of covariance matrix inversion, but its adaptive versions can be realized directly from the observation data without the explicit estimate of the covariance matrix, given in Eq. (47). Furthermore, when the code vector of the desired user is known to the demodulator, the coefficients of the adaptive multi-stage detector, i.e., $u_j$, $B_j$ and $\omega_j$, are determined without any knowledge of the reference information symbols.

In [6, 7], a training-based algorithm for the multistage decomposition is introduced. Using this algorithm, one does not need to calculate an estimate of the covariance matrix. The coefficients of the detector can be estimated directly from the received data vectors and then be used to demodulate the data after the training period. Also, in this algorithm, the dimension of the blocking matrix $\hat{B}_j[i]$ can be kept the same (i.e., in an N×N matrix form) for every stage. Evidently, such a blocking matrix can be obtained from the following formula:

$$\hat{B}_j[i] = I - \hat{u}_j[i]\hat{u}_j^\dagger[i], \quad (48)$$

where $\hat{u}_j[i]$ is on estimate of unit vector $u_j[i]$ in Table. 1.

In this manner, the lengths of the registers needed to store the blocking matrices and vectors can be kept the same for every stage, a fact that is very desirable for either a hardware or software realization. To obtain this algorithm let $$d_j^\dagger[i] \triangleq \left[\hat{d}_j^{(1)}[i], \ldots, \hat{d}_j^{(L)}[i]\right] = \hat{u}_j^\dagger[i]X_{j-1}[i], \quad (49)$$

$$X_j[i] \triangleq [x_j^{(1)}[i], \ldots, x_j^{(L)}[i]] = \hat{B}_j[i]X_{j-1}[i], \quad (50)$$

The estimate of the cross-correlation vector $\hat{r}_{x_jd_j}[i]$ is computed then as $$\hat{r}_{x_jd_j}[i] = \hat{B}_j[i]\hat{R}_{x_{j-1}}[i]\hat{u}_j[i] = \frac{1}{L}\hat{B}_j[i]X_{j-1}[i]X_{j-1}^\dagger[i]\hat{u}_j[i] \quad (51)$$

$$= \frac{1}{L}X_j[i]d_j[i] = \frac{1}{L}\sum_{m=1}^{L} x_j^{(m)}[i]d_j^{(m)}[i]^*.$$

Also let the estimate variance of $d_j[i]$ be computed by $$\hat{\sigma}_{d_j}^2[i] = \frac{1}{L}\sum_{m=1}^{L}\left|\hat{d}_j^{(m)}[i]\right|^2, \quad 2 \leq j \leq M.$$

Table 2 depicts a training-based multistage decomposition algorithm.

TABLE 2

Assume that L independent samples of the observation vector $x^{(m)}[i]$ are available for the initial acquisition Let $X_0[i] \triangleq [x^{(1)}[i], \ldots, x^{(L)}[i]]$
Forward Recursion Initialization: Let $\hat{u}_1 = \frac{s_1}{\|s_1\|}$ and $\hat{B}_1 = I - \hat{u}_1\hat{u}_1^\dagger$ For j = 1 to (M − 1)
    Calculate $d_j$ and $x_j$ $$d_j^\dagger[i] \triangleq \left[\hat{d}_j^{(1)}[i], \ldots, \hat{d}_j^{(L)}[i]\right] = \hat{u}_j^\dagger[i]X_{j-1}[i],$$

$$X_j[i] \triangleq [x_j^{(1)}[i], \ldots, x_j^{(L)}[i]] = \hat{B}_j[i]X_{j-1}[i],$$

TABLE 2-continued

Calculate the (j + 1)-th stage basis vector, $$\hat{r}_{x_jd_j}[i] = \frac{1}{L}\sum_{m=1}^{L} x_j^{(m)}[i]d_j^{(m)}[i]^* = \frac{1}{L}X_j[i]d_j[i]$$

$$\hat{\delta}_{j+1}[i] = \|\hat{r}_{x_jd_j}[i]\|$$

$$\hat{u}_{j+1}[i] = \frac{\hat{r}_{x_jd_j}[i]}{\hat{\delta}_{j+1}[i]}$$

Determine the (j + 1)-th blocking matrix $\hat{B}_{j+1}$ $$\hat{B}_{j+1}[i] = I - \hat{u}_{j+1}[i]\hat{u}_{j+1}^\dagger[i]$$

End
Compute $d_M^{(m)}[i]$ and set it equal to $\epsilon_M^{(m)}[i]$ $$d_M^\dagger[i] \triangleq \left[\hat{d}_M^{(1)}[i], \ldots, \hat{d}_M^{(L)}[i]\right] = e_M^\dagger[i] = \hat{u}_M^\dagger[i]X_{M-1}[i],$$

Backward Recursion $$\hat{\sigma}_{d_M}^2[i] = \frac{1}{L}\sum_{m=1}^{L}\left|\hat{d}_M^{(m)}[i]\right|^2 = \hat{\xi}_M[i], \hat{\omega}_M[i] = \hat{\xi}_M^{-1}[i]\hat{\delta}_M[i]$$

For j = M − 1 to 2
    Estimate the variance of $d_j[i]$ $$\hat{\sigma}_{d_j}^2[i] = \frac{1}{L}\sum_{m=1}^{L}\left|\hat{d}_j^{(m)}[i]\right|^2$$

Estimate the variance of $\epsilon_j$ $$\hat{\xi}_j[i] \triangleq \hat{\sigma}_{\epsilon_j}^2[i] = \hat{\sigma}_{d_j}^2[i] - \hat{\xi}_{j+1}^{-1}[i]\hat{\delta}_{j+1}^2[i]$$

Calculate the j-th scalar Wiener filter $\hat{\omega}_j[i]$ $$\hat{\omega}_j[i] = \frac{\hat{\delta}_j[i]}{\hat{\xi}_j[i]}$$

End

Then the variance of the error $\hat{\xi}_j[i]$ can be obtained from the difference equation, $$\hat{\xi}_j[i] = \hat{\sigma}_{d_j}^2[i] - \hat{\xi}_{j+1}^{-1}[i]\hat{\delta}_{j+1}^2[i]. \quad (52)$$

The rank-M algorithm shown in [7] is summarized in Table. 2. For the blocking matrix $\hat{B}_j[i]$, given in Eq. (48) in Table. 2, one observes that the matrix multiplications required to compute $X_j[i]$ are given in Eq. (50). These matrix multiplications can be avoided by the substitution of $\hat{B}_j[i]$ into Eq. (50). That is, $$X_j[i] = \hat{B}_j[i]X_{j-1}[i] = \left(I - \hat{u}_j[i]\hat{u}_j^\dagger[i]\right)X_{j-1}[i]$$

$$= X_{j-1}[i] - \hat{u}_j[i]\hat{u}_j^\dagger[i]X_{j-1}[i] = X_{j-1}[i] - \hat{u}_j[i]\hat{d}_j^\dagger[i]$$

Using this result, a further simplified version of Table 2 is given in Table 3. Note that this new structure no longer requires the calculation of a blocking matrix and the computational complexity is reduced significantly.

In this invention, an iterative algorithm of the multistage decomposition is developed. Instead of estimating the parameters in the batch mode, the parameters also can be estimated iteratively. By this means, the coefficients of the filter are updated every time that data are received. Thus, the filter can more rapidly keep track adaptively of the changes in the interference environment.

An Iterative Version of the Multistage Adaptive Filter

In order to afford the possibility of following the statistical variations of the observed data when the detector operates in a non-stationary environment, a weighting factor is often used to ensure that data in the distant past are forgotten. A special form of weighting that is commonly used is the exponential weighting factor. As shown in Simon Haykin, *Adaptive Filter Theory*, Prentice-Hall, Upper Saddle River, N.J., 1996, the contents of which are hereby expressly incorporated by reference [20], an estimate of the cross-correlation vector $\hat{r}_{x_j d_j}[i]$ can be expressed as $$\hat{r}_{x_j d_j}[i] = \sum_{m=1}^{n} (1-\alpha)^{n-m} x_j^m[i] d_j^{(m)}[i]^*, \quad (53)$$

where $\alpha$ is a positive constant less than 1. The inverse of $\alpha$ is, roughly speaking, a measure of the memory of the algorithm. The special case, when $\alpha$ approaches zero, corresponds to infinite memory.

Table 3 shows a simplified training-based batch-mode multistage decomposition algorithm.

TABLE 3

Assume that L independent samples of the observation vector $x^{(m)}[i]$ are available for the initial acquisition. Let $X_0[i] \triangleq [x^{(1)}[i], \ldots, x^{(L)}[i]]$ Forward Recursion Initialization: Let $\hat{u}_1 = \dfrac{s_1}{\|s_1\|}$ and $x_0[i] = x[i]$ For j = 1 to (M − 1)
  Calculate $d_j$ and $x_j$ $d_j[i] = \hat{u}_j^\dagger[i] x_{j-1}[i]$ $x_j[i] = x_{j-1}[i] - \hat{u}_j[i] d_j[i]$ $d_J^\dagger[i] \triangleq \left[ \hat{d}_J^{(1)}[i], \ldots, \hat{d}_J^{(L)}[i] \right] = \hat{u}_j^\dagger[i] X_{j-1}[i],$ $X_J[i] \triangleq [x_J^{(1)}[i], \ldots, x_J^{(L)}[i]] = X_{j-1}[i] - \hat{u}_j[i] d_j^\dagger[i]$ Calculate the (j + 1)-th stage basis vector, $\hat{r}_{x_j d_j}[i] = \dfrac{1}{L} \sum_{m=1}^{L} x_j^{(m)}[i] d_j^{(m)}[i]^* = \dfrac{1}{L} X_j[i] d_j[i]$ $\hat{\delta}_{j+1}[i] = \|\hat{r}_{x_j d_j}[i]\|$ $\hat{u}_{j+1}[i] = \dfrac{\hat{r}_{x_j d_j}[i]}{\hat{\delta}_{j+1}[i]}$ End
Compute $d_M^{(m)}[i]$ and set it equal to $\epsilon_M^{(m)}[i]$ $d_M^\dagger[i] \triangleq \left[ \hat{d}_M^{(1)}[i], \ldots, \hat{d}_M^{(L)}[i] \right] = e_M^\dagger[i] = \hat{u}_M^\dagger[i] X_{M-1}[i],$ Backward Recursion Let $\hat{\sigma}_{d_M}^2[i] = \dfrac{1}{L} \sum_{m=1}^{L} |\hat{d}_M^{(m)}[i]|^2 = \hat{\xi}_M[i],\ \hat{\omega}_M[i] = \hat{\xi}_M^{-1}[i] \hat{\delta}_M[i]$ TABLE 3-continued For j = M − 1 to 2
  Estimate the variance of $d_j[i]$ $\hat{\sigma}_{d_j}^2[i] = \dfrac{1}{L} \sum_{m=1}^{L} |\hat{d}_j^{(m)}[i]|^2$ Estimate the variance of $\epsilon_j$ $\hat{\xi}_j[i] \triangleq \hat{\sigma}_{\epsilon_j}^2[i] = \hat{\sigma}_{d_j}^2[i] - \hat{\xi}_{j+1}^{-1}[i] \hat{\delta}_{j+1}^2[i]$ Calculate the j-th scalar Wiener filter by $\hat{\omega}_j[i]$ $\hat{\omega}_j[i] = \dfrac{\hat{\delta}_j[i]}{\hat{\xi}_j[i]}$ End The summation on the right hand side of Eq. (53) can be written as the difference or iterative equation.

$$\hat{r}_{x_j d_j}^{(n)}[i] = (1-\alpha)\left[\sum_{m=1}^{n-1} (1-\alpha)^{n-1-m} x_j^{(m)}[i] d_j^{(m)}[i]\right] + x_j^{(n)}[i] d_j^{(n)}[i] \quad (54)$$

$$= (1-\alpha)\hat{r}_{x_j d_j}^{(n-1)}[i] + x_j^{(n)}[i] d_j^{(n)}[i],$$

where $$\hat{r}_{x_j d_j}^{(n-1)}[i]$$

is the previous value of $$\hat{r}_{x_j d_j}^{(n)}[i],$$

and the term $$x_j^{(n)}[i] d_j^{(n)}[i]^*$$

is obtained from the new data. Hence, for each iteration, only two quantities $$\left(\hat{r}_{x_j d_j}^{(n-1)}[i] \text{ and } x_j^{(n)}[i] d_j^{(n)}[i]^*\right)$$

are necessary for updating $$\hat{r}_{x_j d_j}^{(n)}[i].$$

The length of the observation-data that contributes to the estimate, $$\hat{r}_{x_j d_j}^{(n)}[i],$$

is determined by the weighting factor $$\alpha \triangleq \frac{1}{L},$$

where L is the time constant corresponding to the length of the batch-mode in Tables 2 and 3.

The exponential weighting factor is substituted in the algorithm in Table 3. This results in the iterative algorithm shown in Table 4. The algorithms in Tables 3 and 4 do not require any need for matrix multiplications. Also in order to find the estimate î, the time phase interval in Eq. (30c) at which the information of user 1 is found, the algorithm in Table 4 is realized as an IIR adaptive filter bank while the algorithms in Tables. 1, 2 and 3 utilize FIR adaptive filter banks which need substantially more computer memory and computation to realize.

Figure 7:
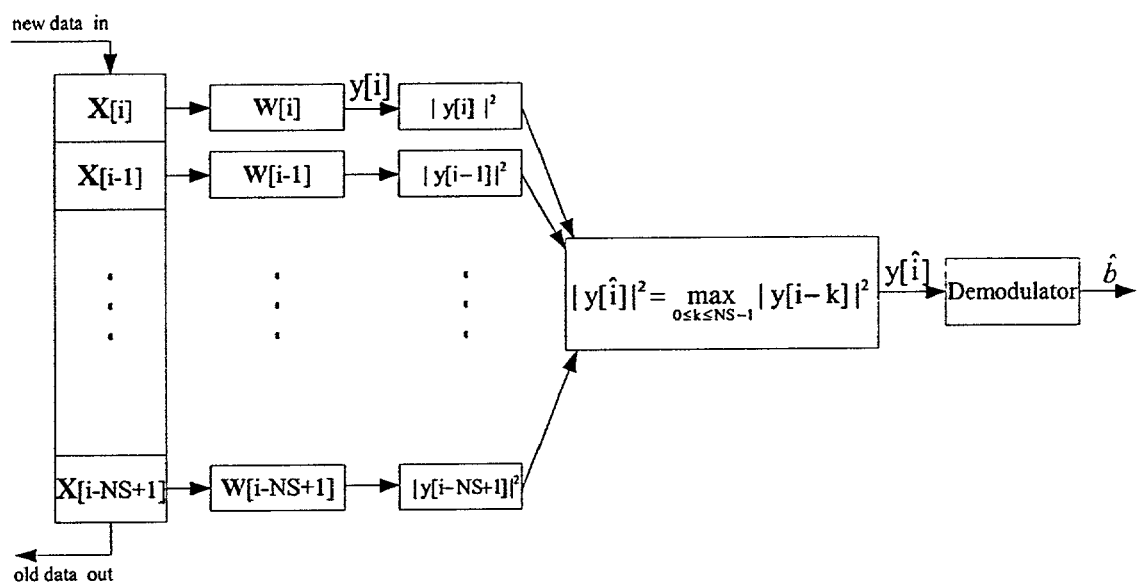
FIG. 7 is an exemplary conceptual block diagram of a self-synchronized detector.
Figure 8:
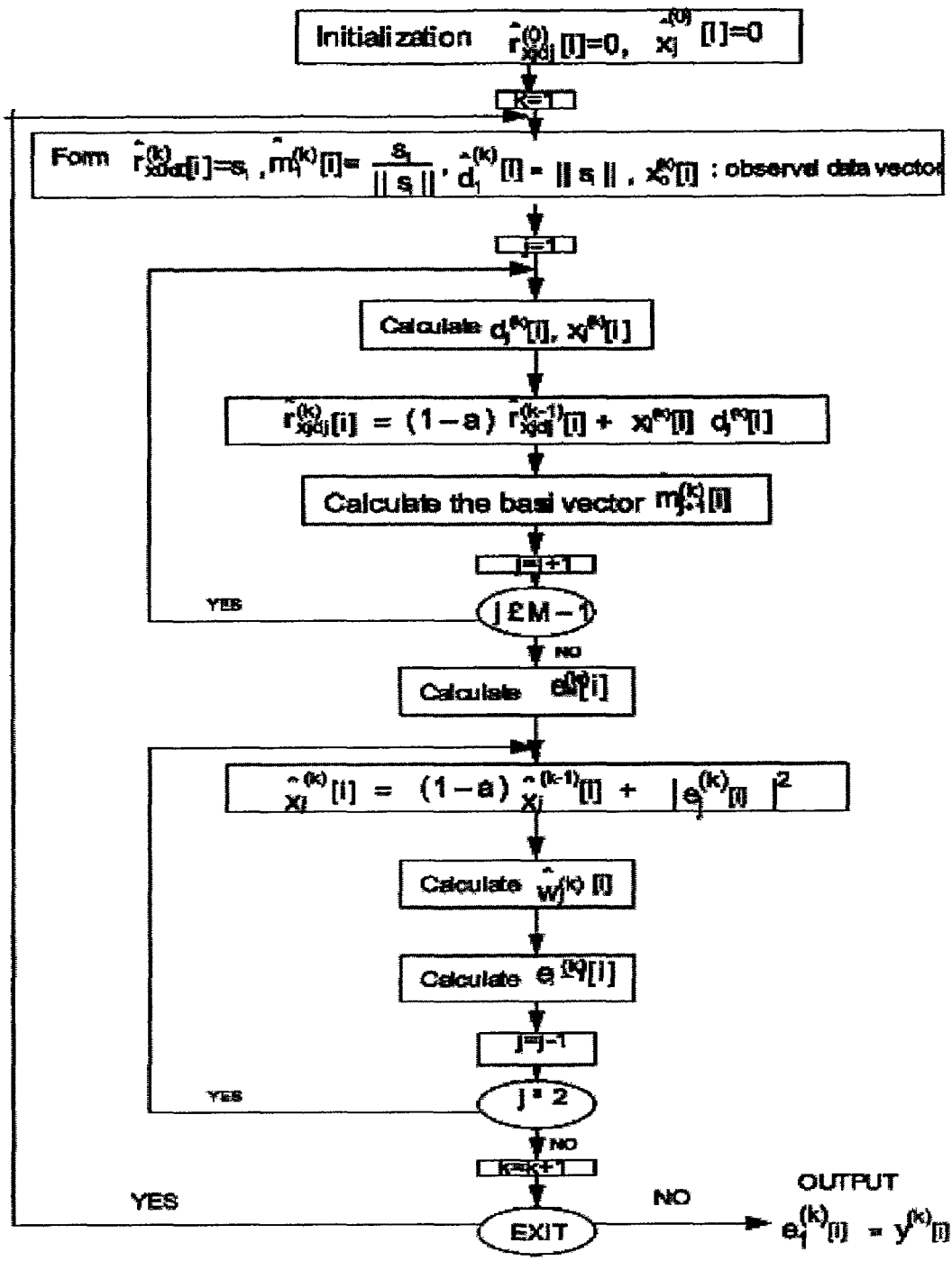
FIG. 8 is an exemplary flow diagram for deriving test statistics by the iterative version of the multistage adaptive filter.
Figure 9:
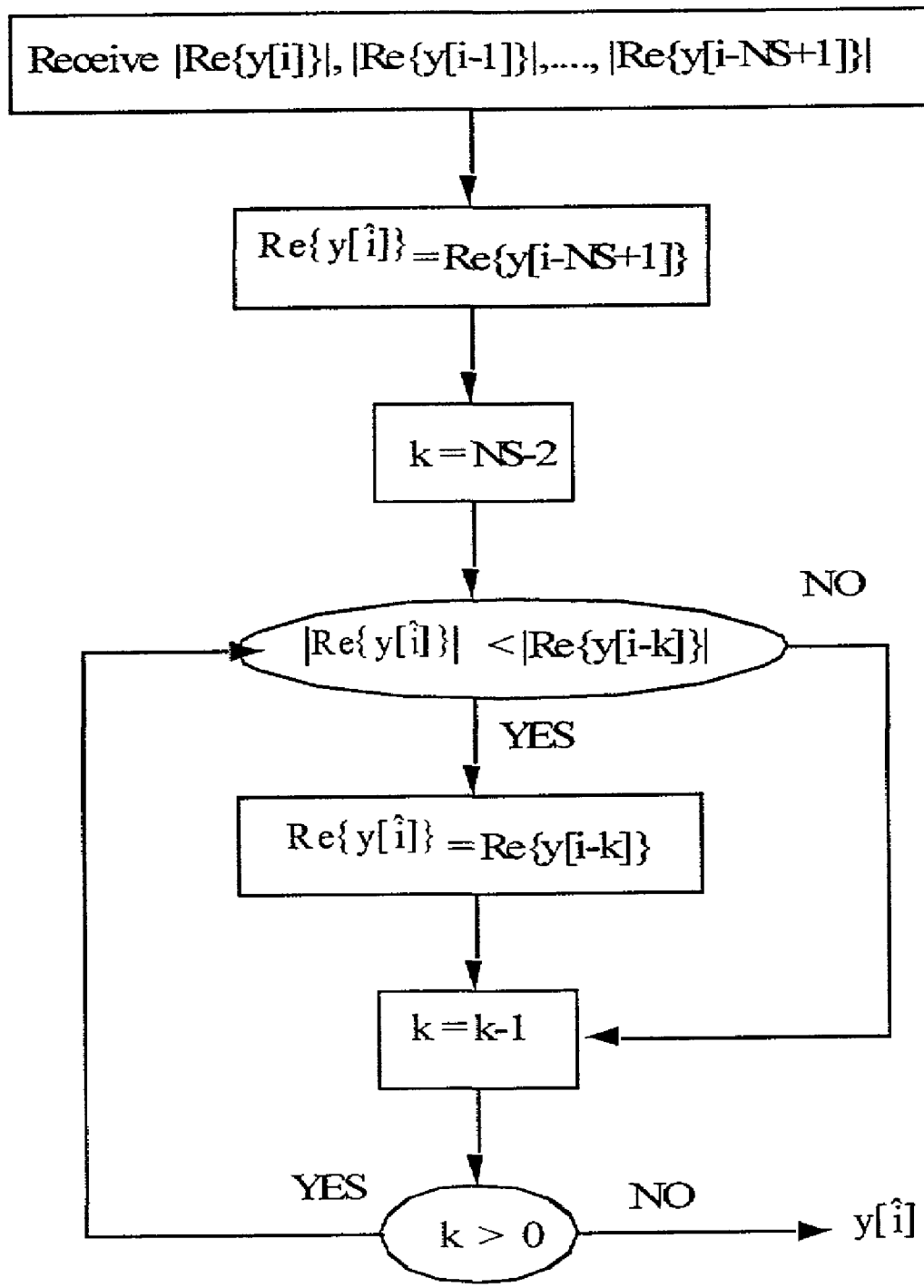
FIG. 9 is an exemplary conceptual flow diagram of block 77 of FIG. 7.
Figure 9A:
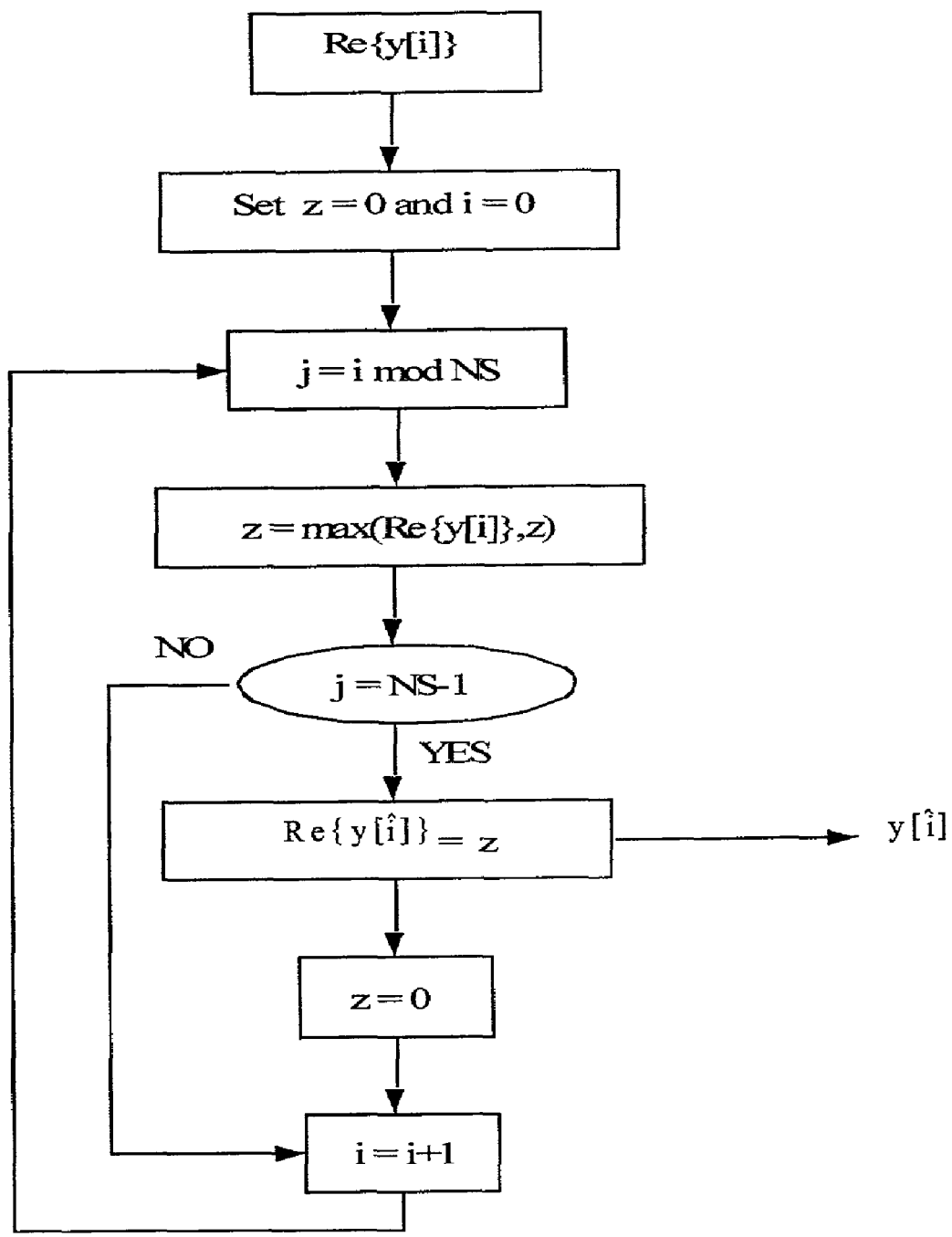
FIG. 9A is an exemplary algorithm for finding the maximum of |Re{y[i]}| over NS period.
Figure 10:
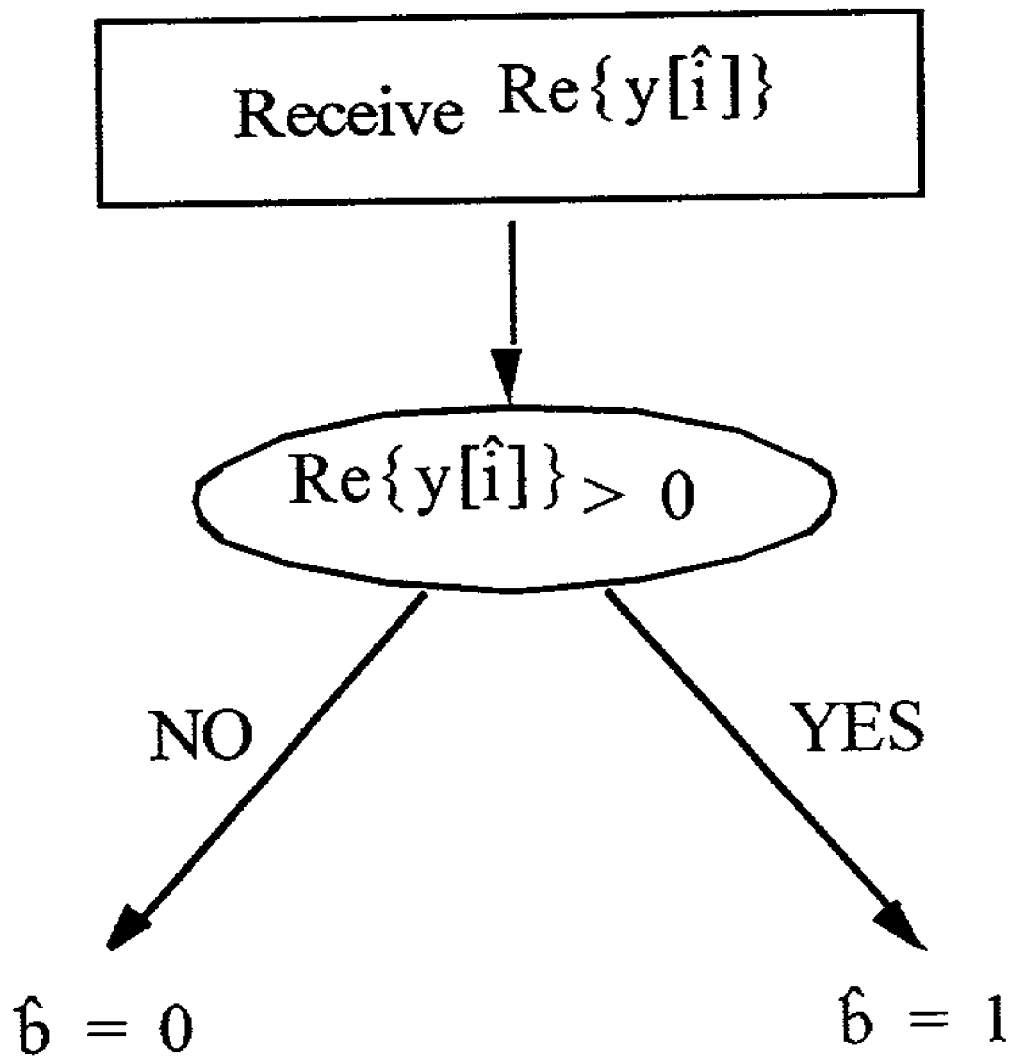
FIG. 10 is an exemplary flow diagram for demodulation system of FIG. 7.

The time phase acquisition process to find the estimate î, defined in Eq. (30c), is illustrated by the conceptual block diagram shown in the FIG. 7. The composition of the data vectors in the exemplary block diagram of FIG. 7 is shown in FIG. 6. The observation data vectors are obtained by sliding a window of length N through the original data. The test statistic $y^{(k)}[i]$ can be derived by the subroutine shown in the FIG. 8. In addition, the conceptual block diagram to find the value of i=î that achieves the maximum value of |Re{y[i]}| is found in FIG. 9. An exemplary algorithm for finding the maximization in Eq. (30c) is shown in FIG. 9A. Finally, FIG. 10 shows the block diagram that is used to demodulate the signal of the desired user.

Numerical Results

In this section simulations were conducted to demonstrate the performance of the proposed asynchronous CDMA receiver. An asynchronous BPSK DS-CDMA system with the number of users K=6 is considered in these simulations. The spreading sequence of each user is a Gold sequence of length N=31 (see Appendix A). A single desired user, say user 1, is acquired and demodulated in the presence of multiple-access interference. Table 4 depicts an exemplary pseudo-code of the iterative multistage decomposition algorithm.

TABLE 4

Let k be the k-th clock time, where k = 1 is the first time the data is observed. Also let α be the memory or time constant of the algorithm.
For k = 1 to n $$\hat{r}_{x_0 d_0}^{(k)}[i] = s_1, \quad \hat{u}_1^{(k)}[i] = \frac{s_1}{\|s_1\|}, \quad \hat{\delta}_1^{(k)}[i] = \|s_1\|,$$

$x_0^{(k)}[i]$ is the received vector.

Forward Recursion

For j = 1 to M − 1

$$d_j^{(k)}[i] = \hat{u}_j^{(k)}[i]^\dagger x_{j-1}^{(k)}[i]$$

TABLE 4-continued $$x_j^{(k)}[i] = x_{j-1}^{(k)}[i] - \hat{u}_j^{(k)}[i] d_j^{(k)}[i]$$

Calculate the (j + 1)-th stage basis vector, $$\hat{r}_{x_j d_j}^{(k)}[i] = (1 - \alpha)\hat{r}_{x_j d_j}^{(k-1)}[i] + x_j^{(k)}[i] d_j^{(k)}[i]^*,$$

$$\hat{\delta}_{j+1}^{(k)}[i] = \|\hat{r}_{x_j d_j}^{(k)}[i]\|$$

$$\hat{u}_{j+1}^{(k)}[i] = \frac{\hat{r}_{x_j d_j}^{(k)}[i]}{\hat{\delta}_{j+1}^{(k)}[i]}$$

End $$\epsilon_M^{(k)}[i] = d_M^{(k)}[i]^\dagger = \hat{u}_M^{(k)}[i]^\dagger x_{M-1}^{(k)}[i]$$

Backward Recursion

For j = M to 2

Estimate the variance of $\epsilon_j^{(k)}[i]$ $$\hat{\xi}_j^{(k)}[i] = (\hat{\delta}_{\epsilon_j}^{(k)})^2[i] = (1 - \alpha)\hat{\xi}_j^{(k-1)}[i] + |\epsilon_j^{(k)}[i]|^2$$

Calculate the j-th scalar Wiener filter $\hat{\omega}_j^{(k)}[i]$ by $$\hat{\omega}_j^{(k)}[i] = \frac{\hat{\delta}_j^{(k)}[i]}{\hat{\xi}_j^{(k)}[i]}$$

Calculate the (j − 1)-th error signal $\epsilon_{j-1}^{(k)}[i]$ by $$\epsilon_{j-1}^{(k)}[i] = d_{j-1}^{(k)}[i] - \hat{\omega}_j^{(k)}[i]^* \epsilon_j^{(k)}[i]$$

End

The output at time k-th is $y^{(k)}[i] = \epsilon_1^{(k)}[i]$

End

The power ratio between each of the five interfering users and the desired user is designated the MAI level. In this simulation all interfering users are assumed to have the same power ratio relative to the desired user. This power ratio is denoted by a quantity called the near-far ratio (NFR), defined by $$NFR = \frac{A_k^2}{A_1^2}, \quad (55)$$

where the subscript 'k' denotes user k; k=1 is the user of interest. For convenience and simplicity it is assumed in the simulations that the propagation delays of the different users are multiples of $T_c$. Note that this assumption is not necessary if the sampling rate is higher than $1/T_c$.

First, the performance of the asynchronous CDMA receiver is found under the assumption that the covariance matrix is known at the receiver. Even though an exact estimation of the covariance matrix is not possible to achieve practically in a real communication system, this experiment provides an upper bound on the performance of the asynchronous CDMA receiver. The algorithm in Table 1 is used for this case.

Figure 11A:
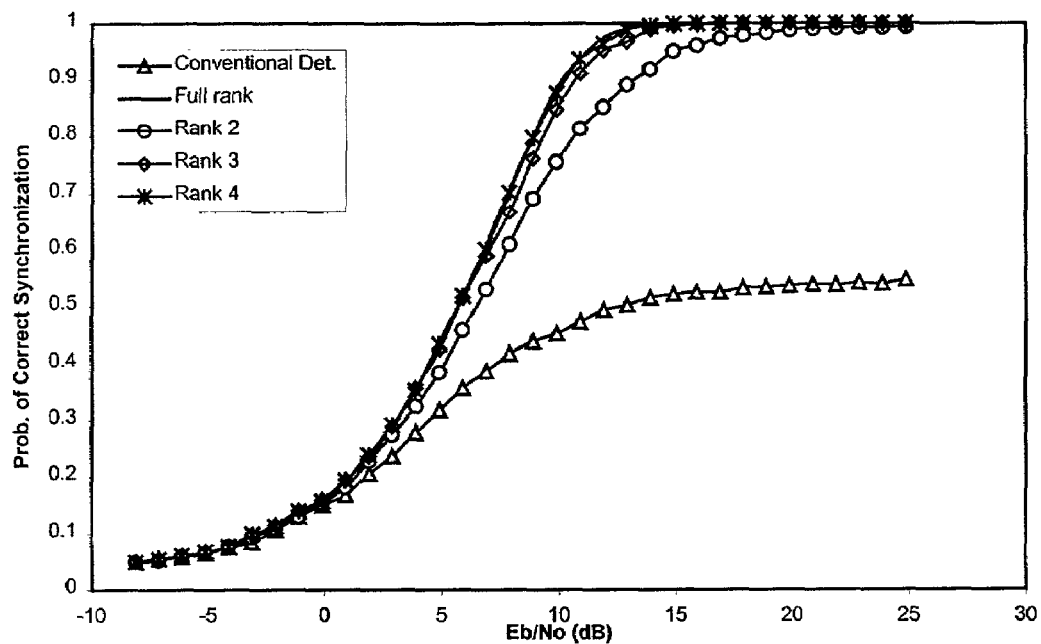
FIGS. 11–20 are performance charts for various embodiments of the present invention.
Figure 11B:
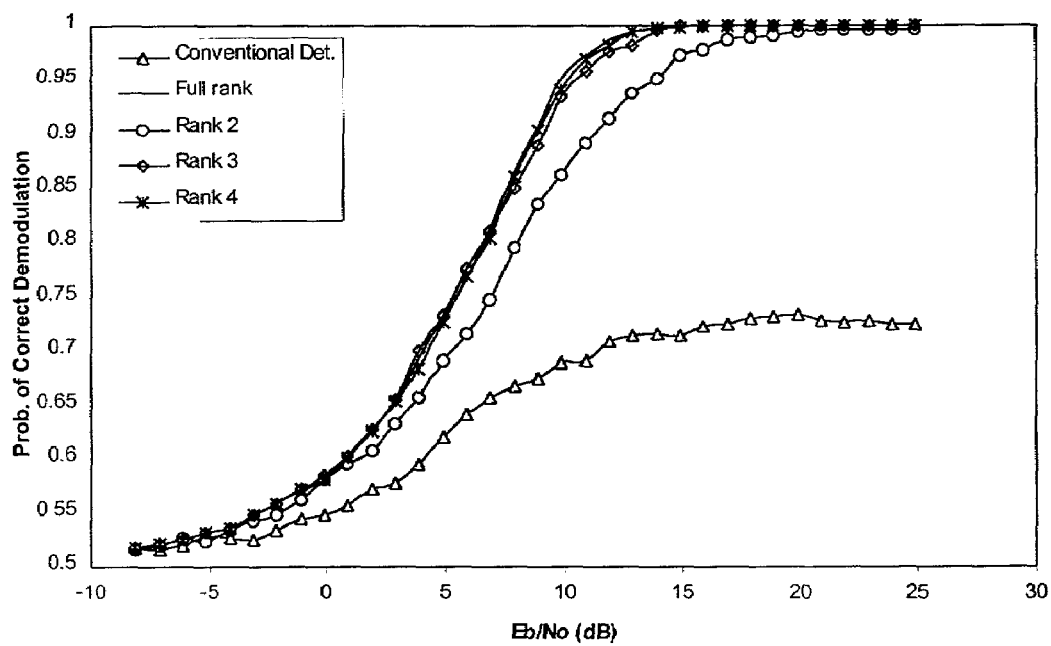

In FIG. 11, the probability of correct synchronization and the probability of correct demodulation are presented as a function of the signal-to-white noise ratio (Eb/No) under the perfect power-control scenano, i.e., all users have the same signal power (NFR=0 dB). In this case the dimension of the full-rank receiver is equal to N=31. Demodulation is accomplished by the use of the estimate of the propagation delay that is obtained from the synchronization system. It is shown in FIG. 11 (NFR=0 dB) that the detector performs better than the conventional detector. Actually, the conventional detector can be considered to be the rank 1 version of the proposed receiver. It is demonstrated in this figure that a rank 2 filter already gains a significant improvement over the conventional detector. This improvement can be even more when the near-far ratio (NFR) is higher. A rank 3 filter achieves almost the same performance as the full rank (rank 31) filter.

Figure 12A:
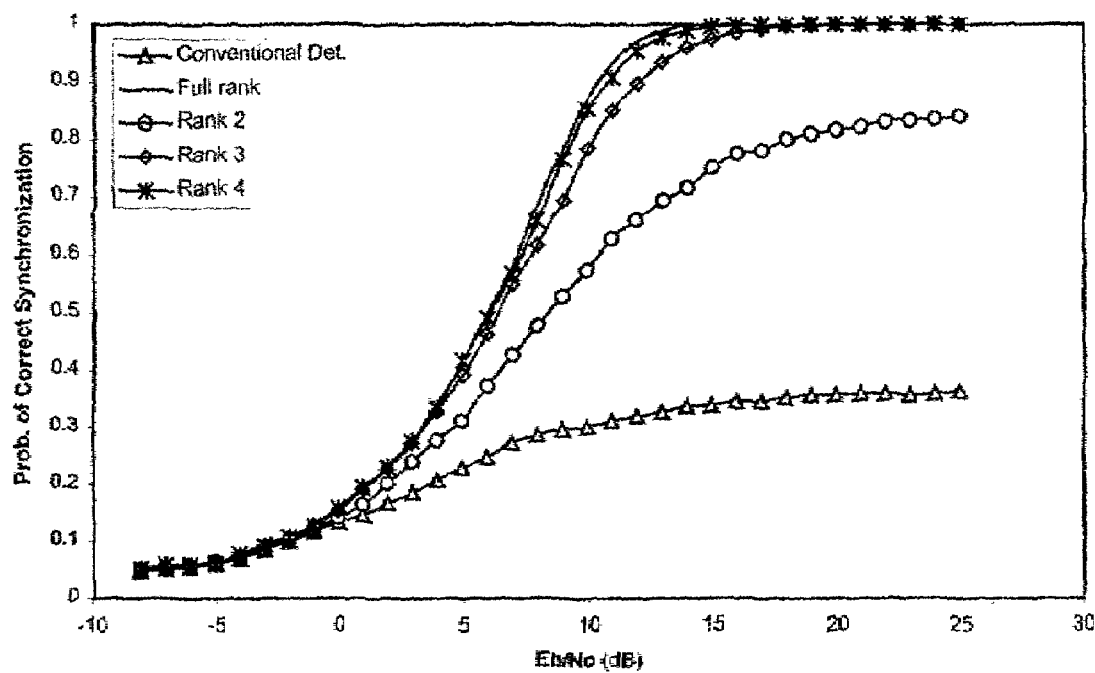
Figure 12B:
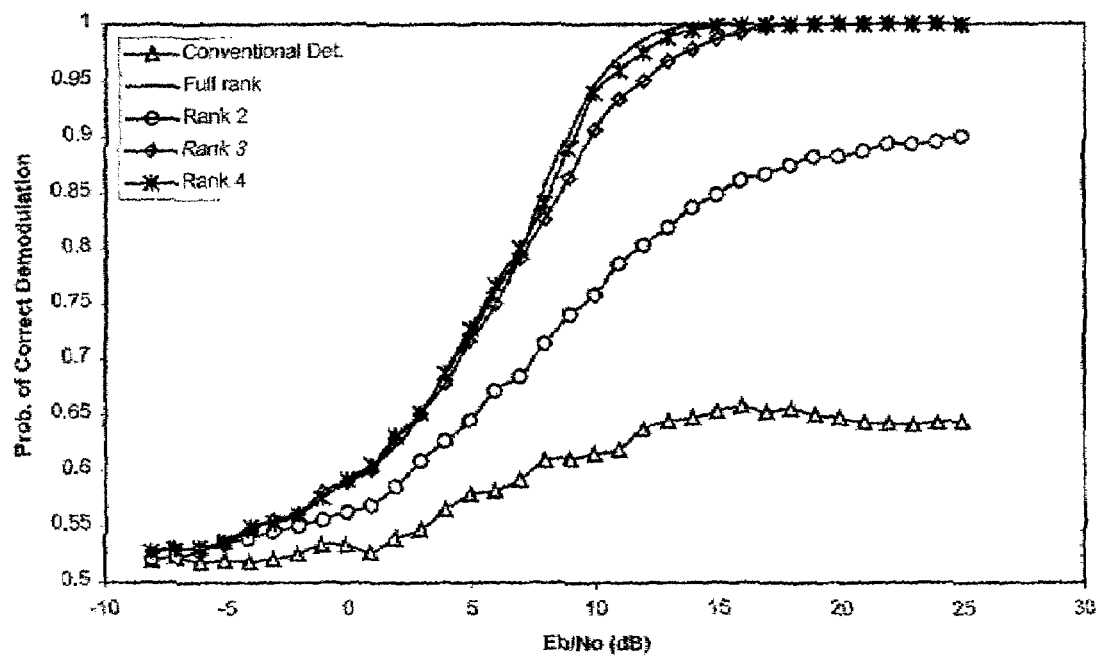

FIG. 12 demonstrates the probability of correct synchronization and the probability of correct demodulation in terms of Eb/No under the near-far situation of NFR=3 dB. All of the other parameters are identical to those used in FIG. 11. Again the covariance matrix is assumed to be known. When the MAI becomes more severe, the receiver performs significantly better than the conventional detector. However, a greater rank (rank 4) is necessary in order to achieve an almost full-rank performance.

The performance of the adaptive implementation of the receiver for the batch algorithm (FIR), given in Table. 3, is shown in FIGS. 13 to 16 with different scenarios for each figure. The different scenarios used in these simulation are summarized in Table 5.

TABLE 5

Exemplary scenarios for testing the adaptive multistage decomposition.

| | N | K | L | NFR |
|---|---|---|---|---|
| FIG. 13 | 31 | 6 | 3N | 0 dB |
| FIG. 14 | 31 | 6 | 3N | 3 dB |
| FIG. 15 | 31 | 6 | 6N | 0 dB |
| FIG. 16 | 31 | 6 | 6N | 3 dB |

Figure 13A:
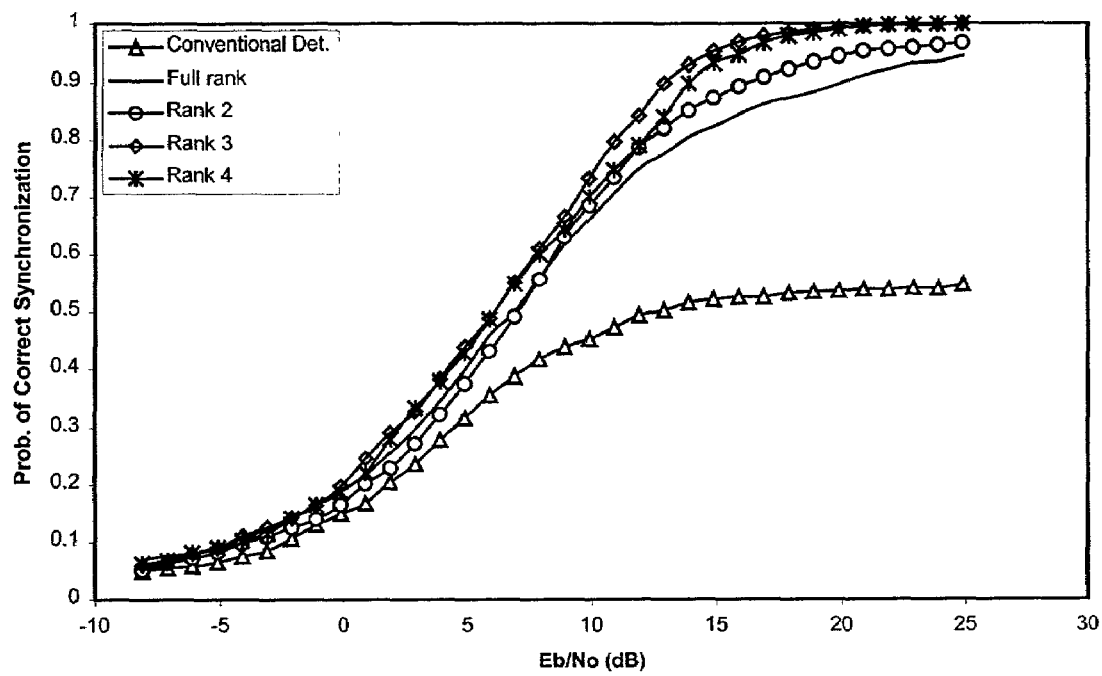
Figure 13B:
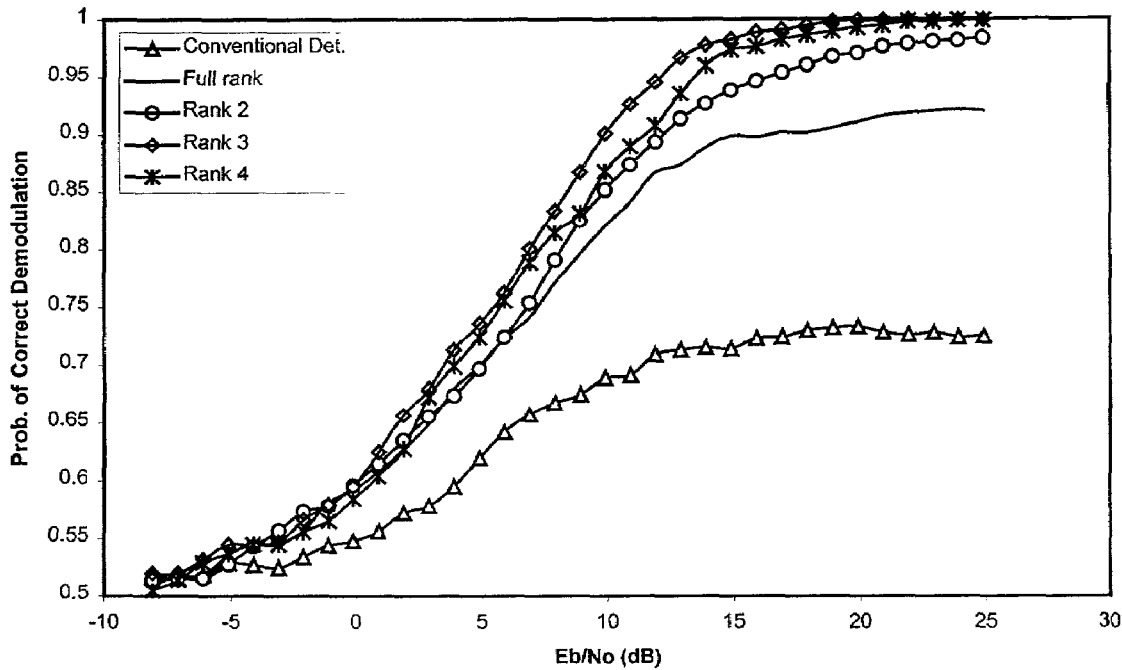
Figure 14A:
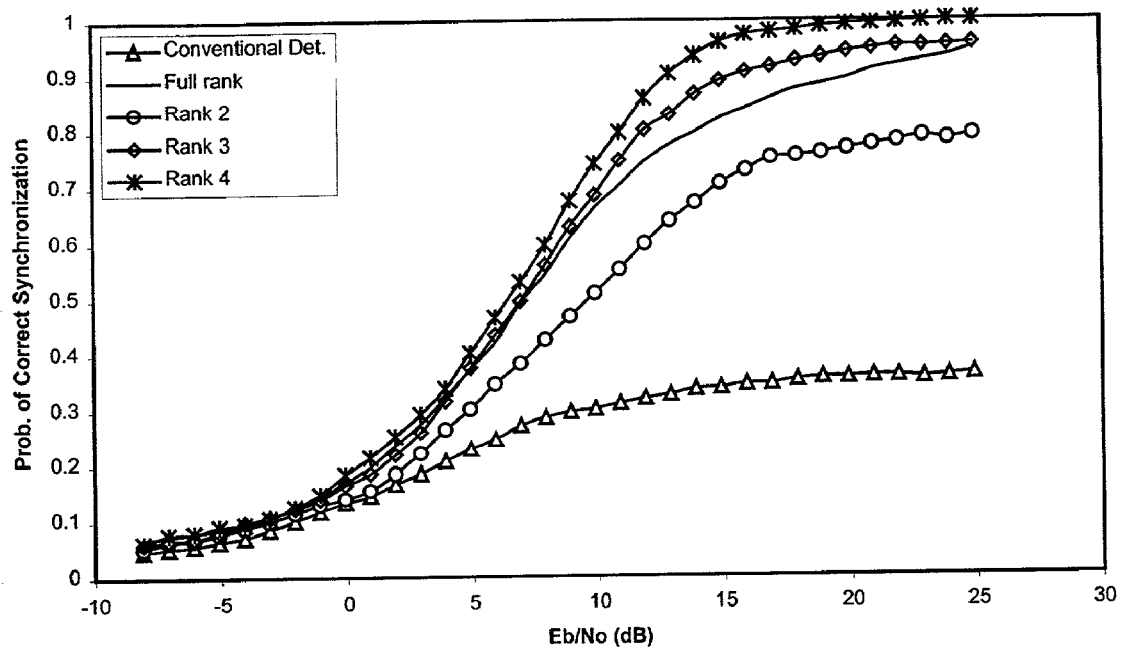
Figure 14B:
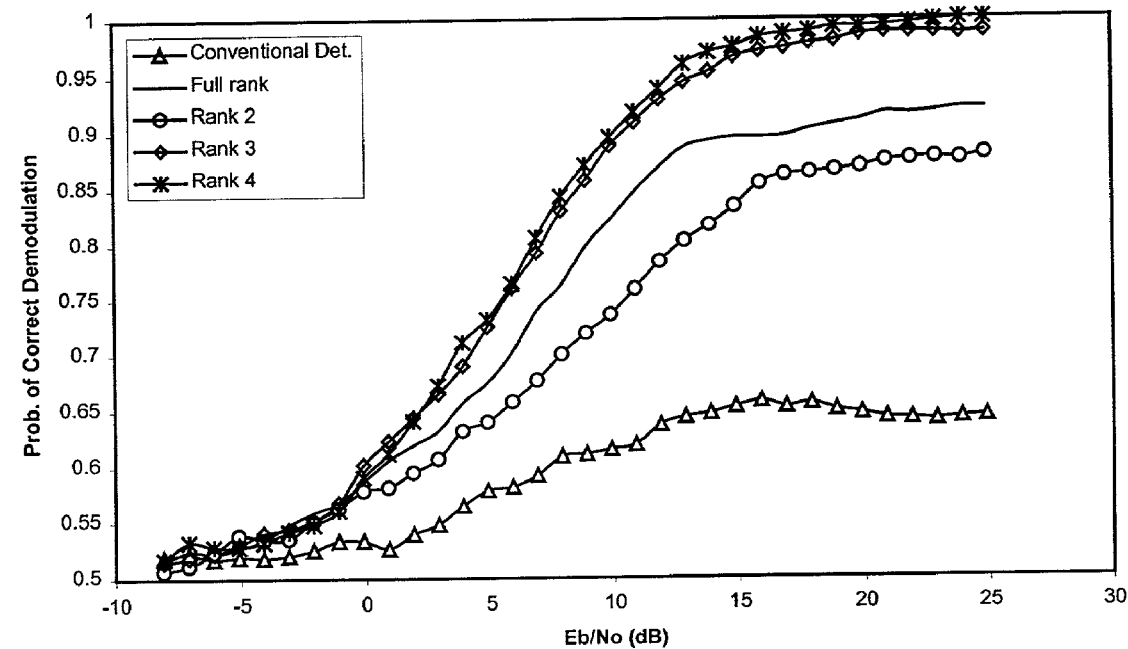

In FIGS. 13(a)–13(c), (NFR=0 dB and L=1/3N) it is shown that rank 2 of receiver performs much better than the conventional detector. The case of rank 2 provides almost the same performance as the full-rank case while rank 3 outperforms the full-rank case. This is due to a lack of training samples in the full-rank case needed to obtain a good estimate of the covariance matrix. As previously stated, the reduced-rank version of the proposed detector requires a smaller number of samples to achieve synchronization and demodulation. FIG. 13(a) shows the probability of correct synchronization vs. signal-to-white noise ratio for k=6, N=31, and NFR=0 dB. FIG. 13(b) depicts the probability of correct demodulation vs. signal-to-white noise ratio for k=6, N=31, and NFR=0 dB However, for the more severe MAI (NFR=3 dB) a greater rank is needed in order to achieve the same or better performance than the full-rank case. This is shown in FIGS. 14(a) and 14(b). By examining FIGS. 13 to 16 one can note that the full-rank receiver needs a larger amount of sample support to perform close to the known covariance matrix case while the reduced-rank receiver requires a smaller number of samples. The required computations to realize the adaptive full-rank receiver is sizeable due to the necessary matrix inversions, especially when the processing gain N of the CDMA system is larger than N=31.

Figure 15A:
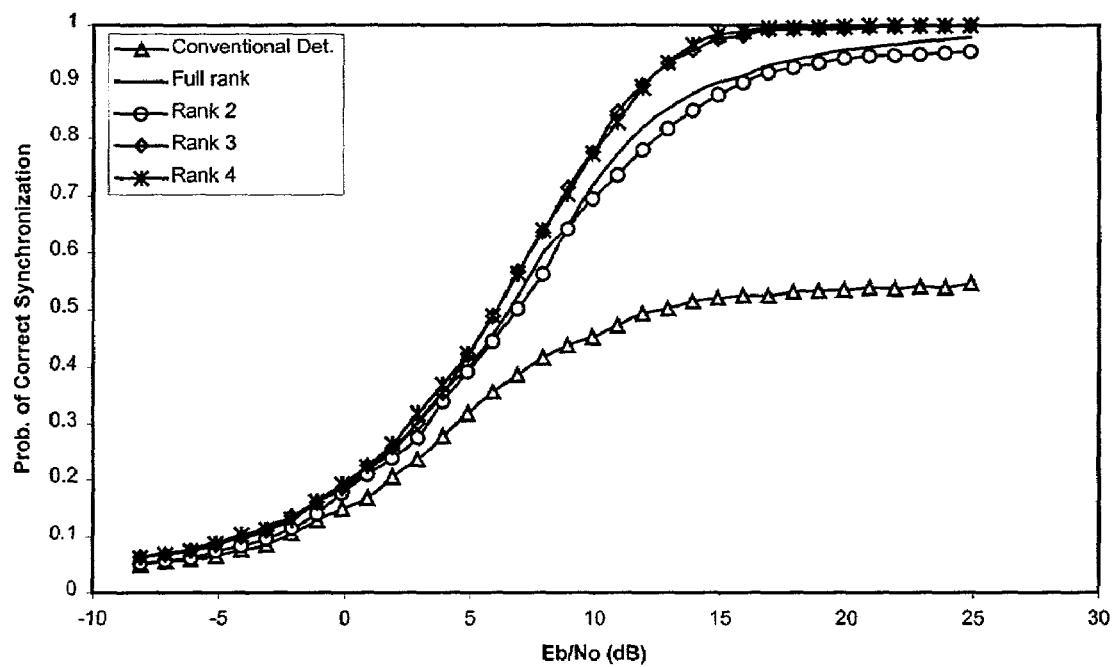
Figure 15B:
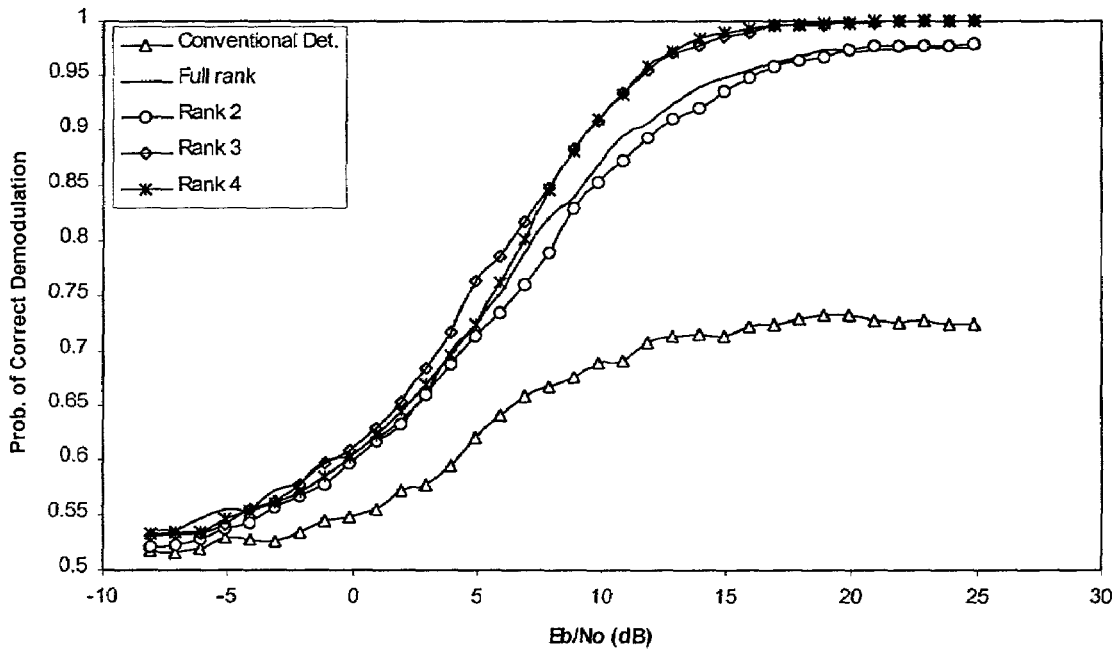
Figure 16A:
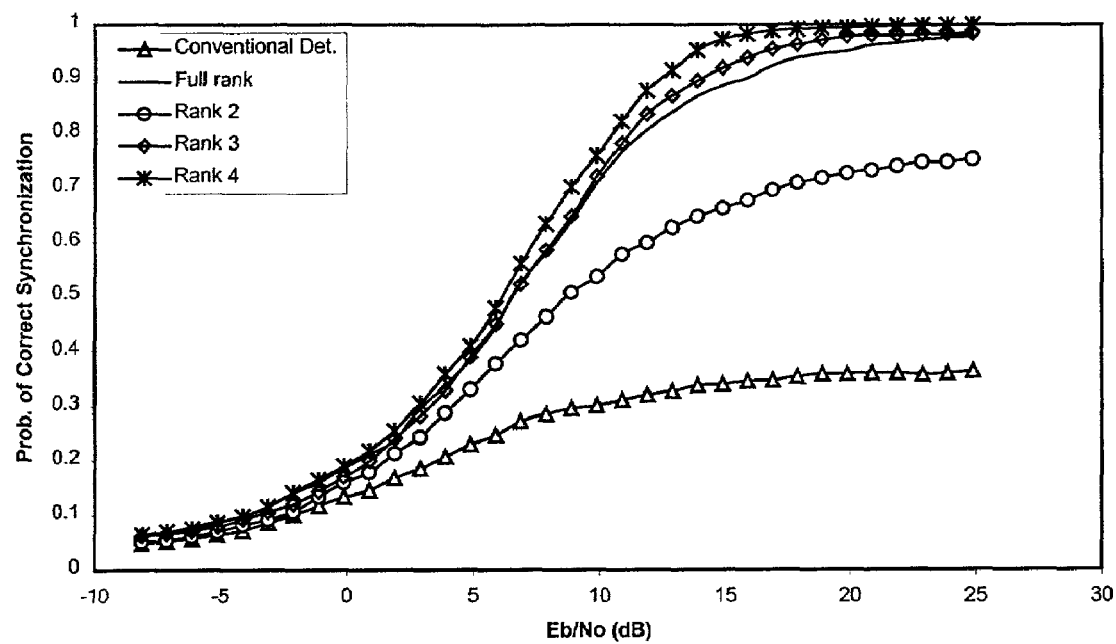
Figure 16B:
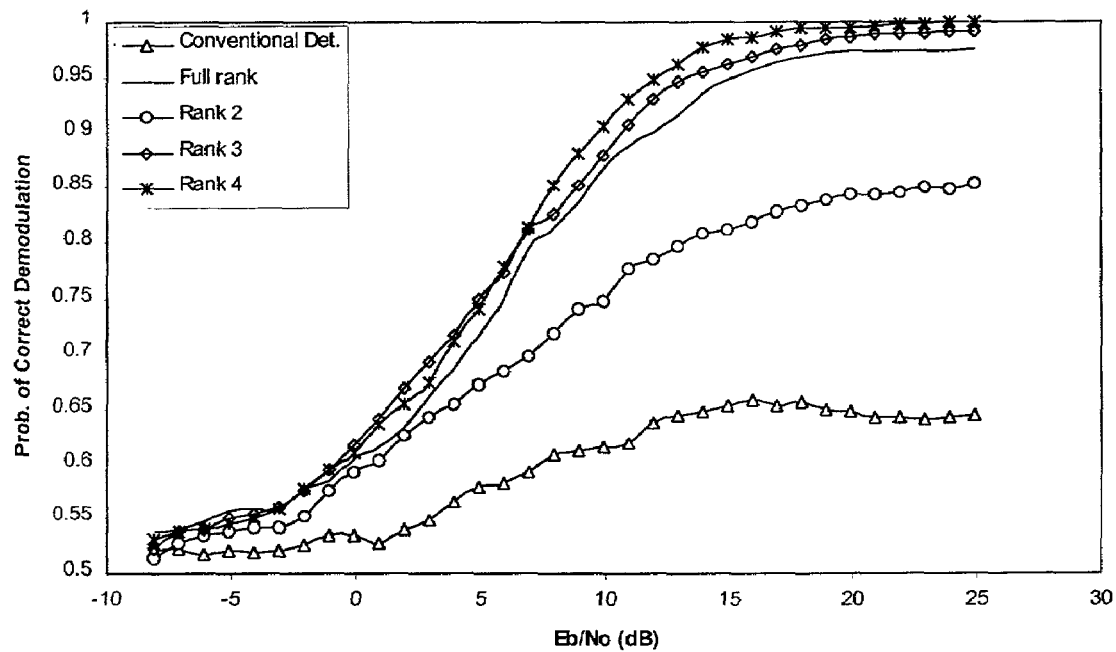

FIGS. 15a and 15B show the batch algorithm in Table 3 with number of training samples L=6N. FIG. 15a shows a graph for the probability of correct synchronization vs. signal to white noise ratio for K=6, N=31, and NFR is 0 dB. FIG. 15b shows a graph for the probability of correct demodulation vs. signal to white noise ratio for K=6, N=31, and NFR is 0 dB. FIGS. 16a and 16B show the Batch algorithm in Table 3 with number of training samples L=6N. FIG. 16a shows a graph for the probability of correct synchronization vs. signal to white noise ratio for K=6, N=31, and NFR is 3 dB. FIG. 16b shows a graph for the probability of correct demodulation vs. signal to white noise ratio for K=6, N=31, and NFR is 3 dB.

Figure 17A:
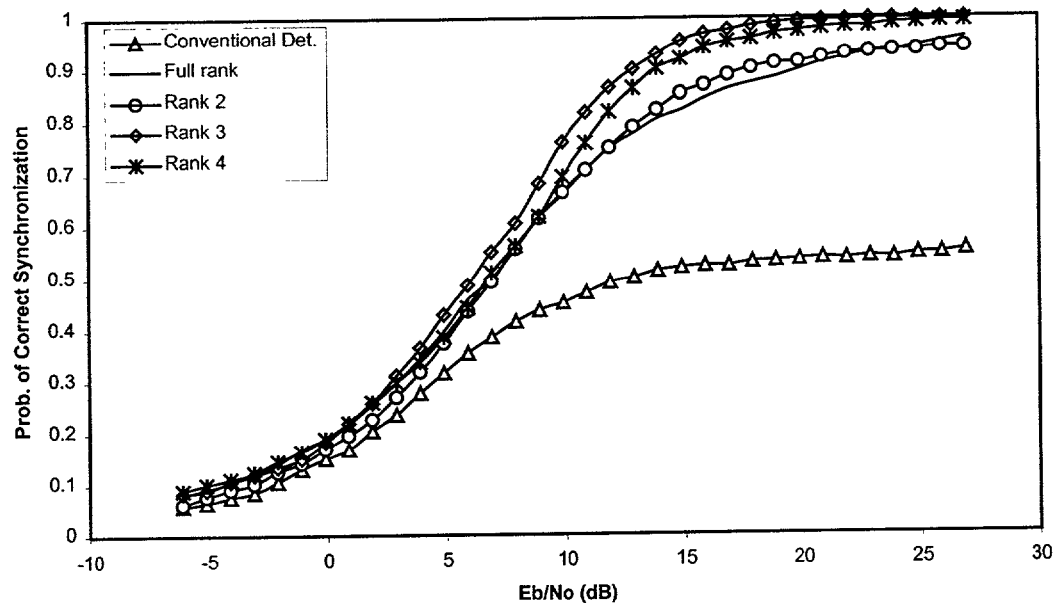
Figure 17B:
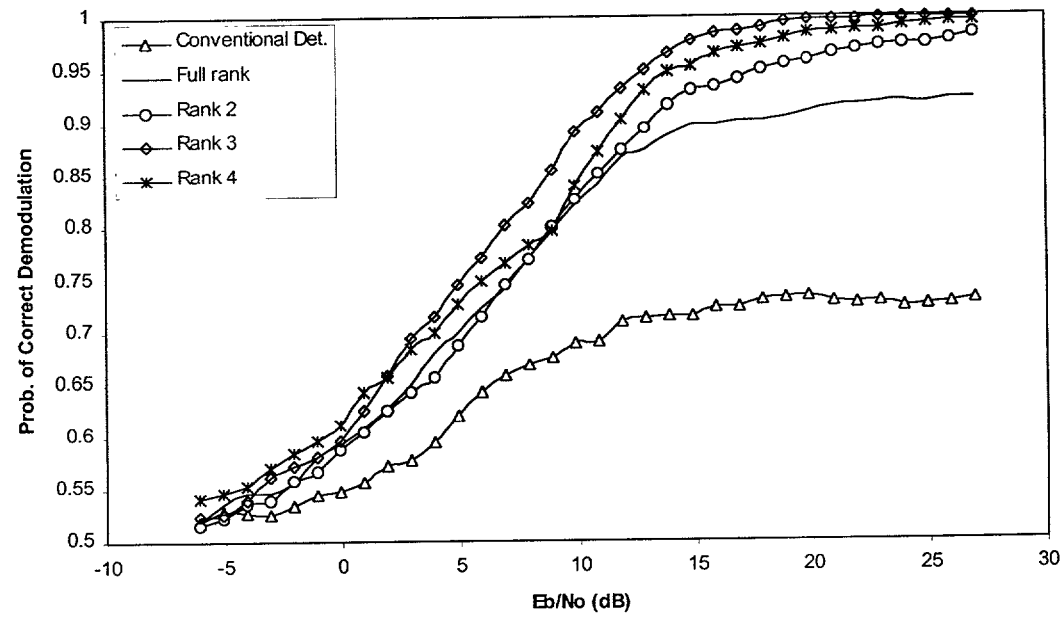
Figure 18A:
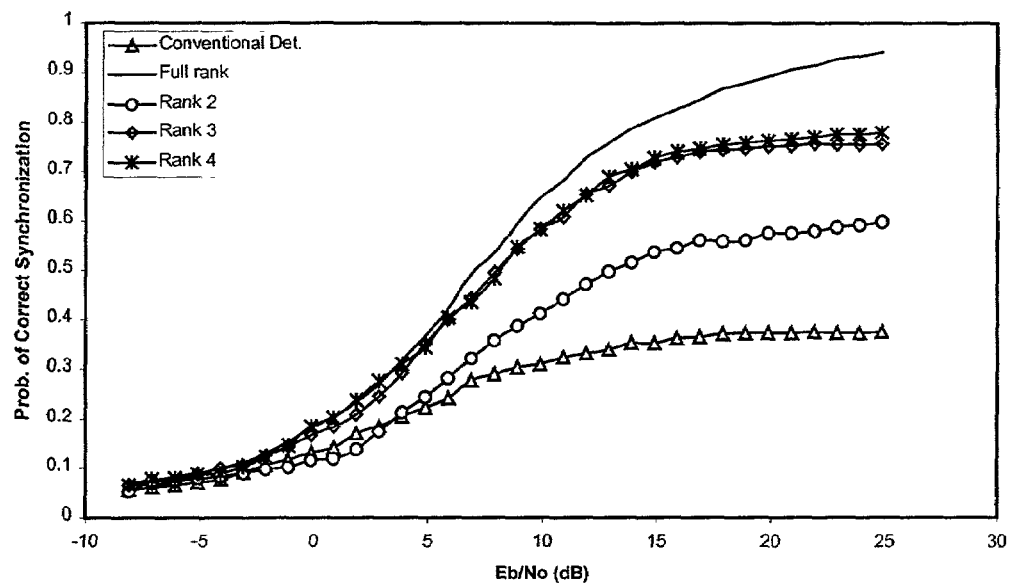
Figure 18B:
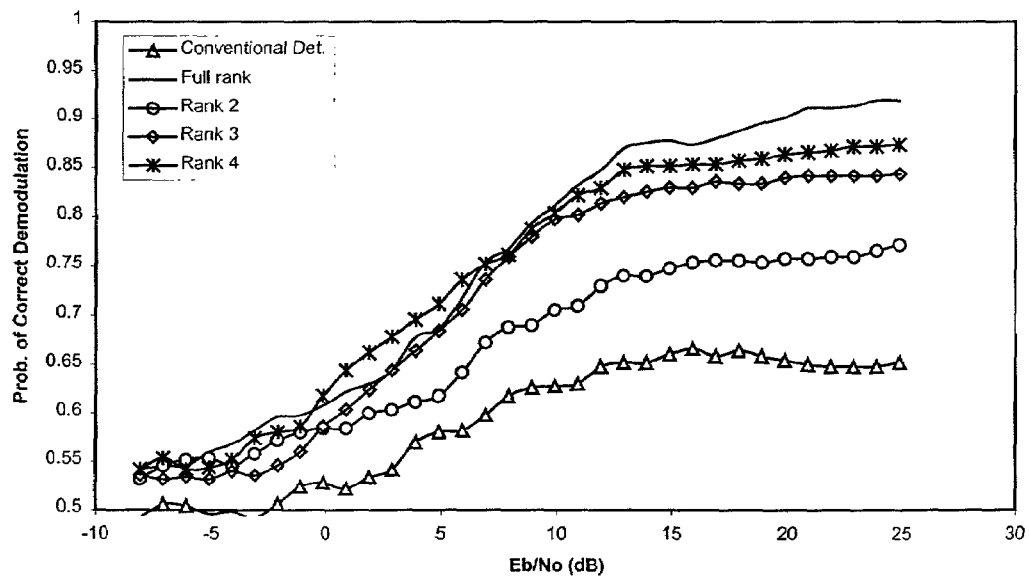
Figure 19A:
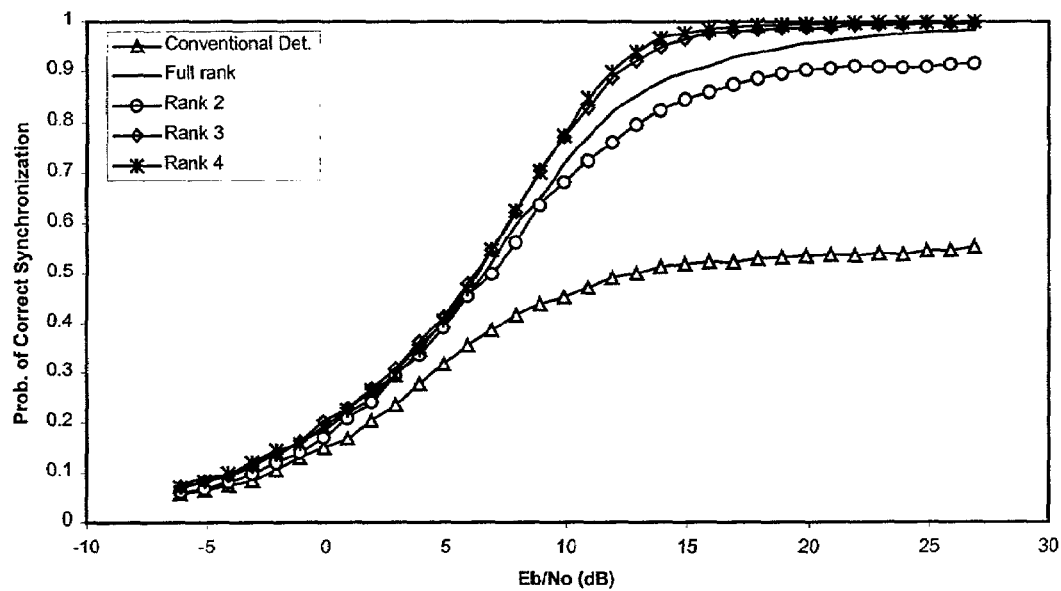
Figure 19B:
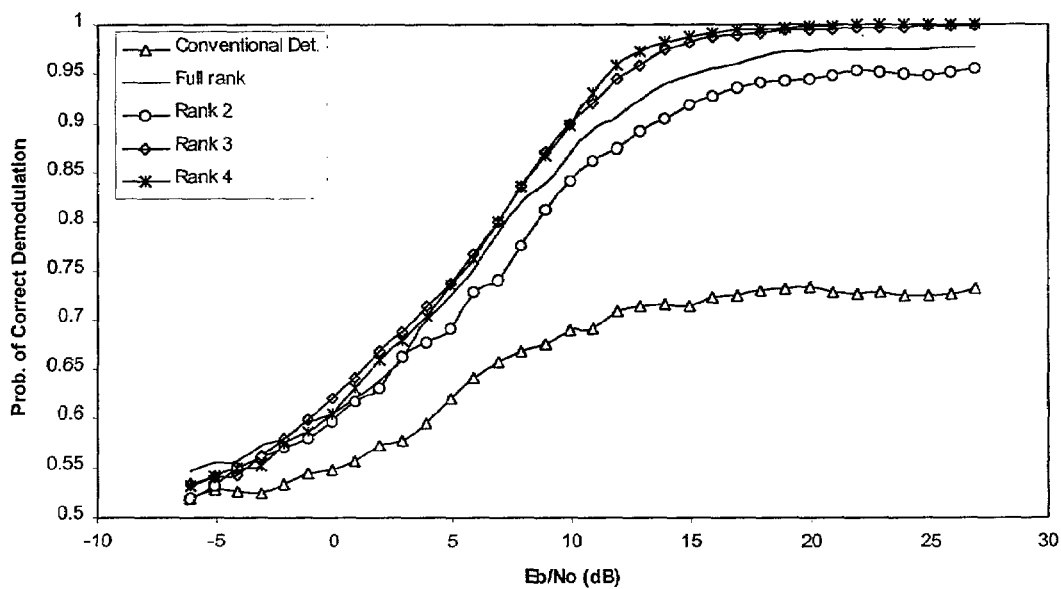
Figure 20A:
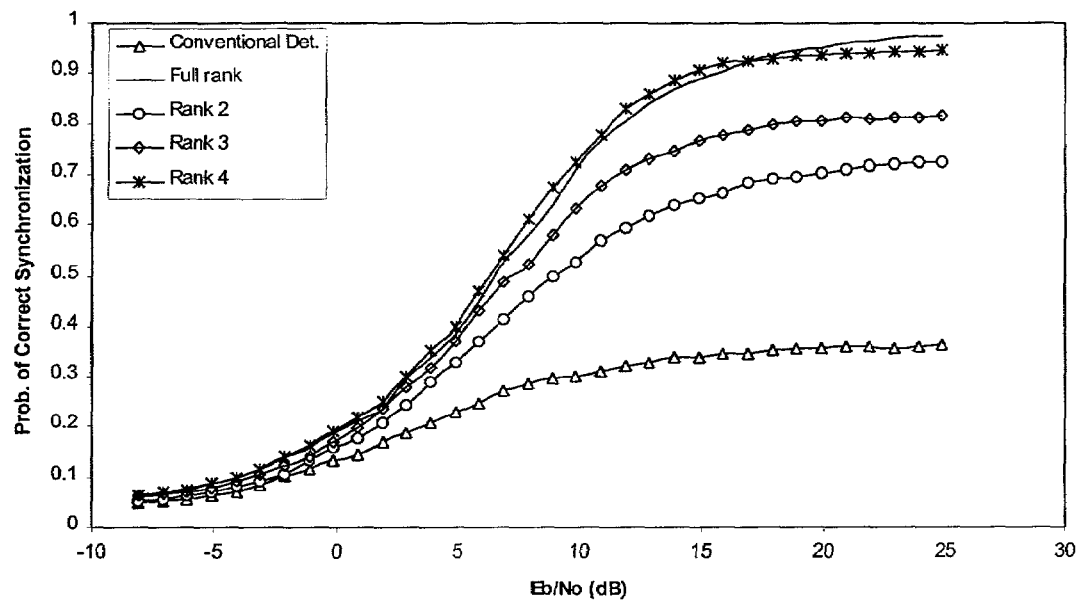
Figure 20B:
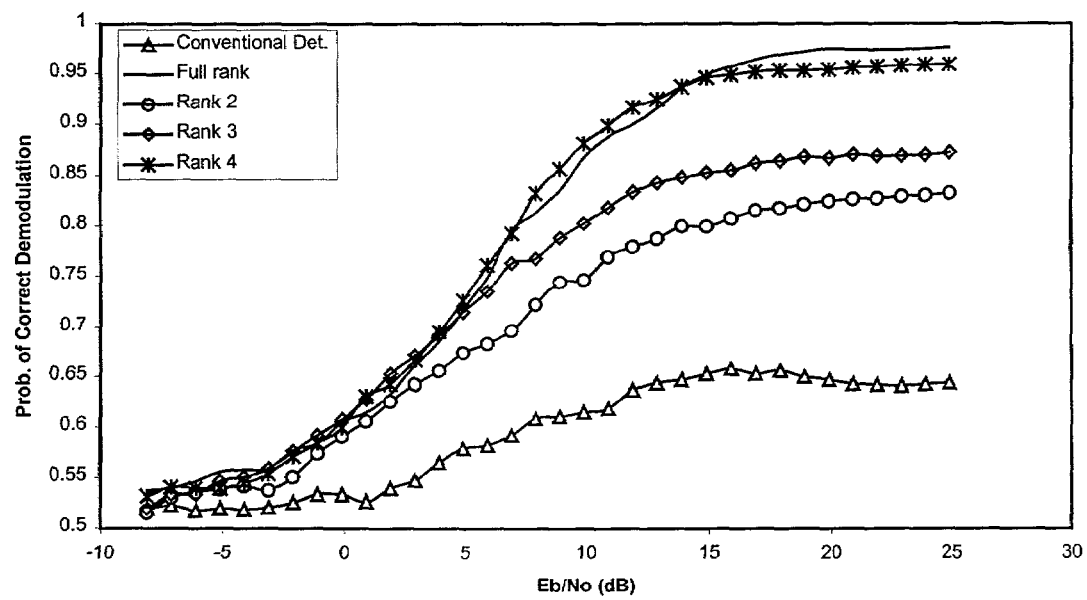

Finally, the performance of the iterative or IIR algorithm of the receiver in Table 4 is shown in FIGS. 17 and 18 with $\alpha=1/3N$ and FIGS. 19 and 20 with $\alpha=1/6N$. Also for these two cases the near-far ratios are set respectively to 0 dB and 3 dB. FIG. 19a shows the probability of correct synchronization vs. signal to white noise ratio for K=6, N=31, and NFR=0 dB, and FIG. 19a shows the probability of correct demodulation vs. signal to white noise ratio for K=6, N=31, and NFR=0 dB. FIG. 20a shows the probability of correct synchronization vs. signal to white noise ratio for K=6, N=31, and NFR=3 dB, and FIG. 20b shows the probability of correct demodulation vs. signal to white noise ratio for K=6, N=31, and NFR=3 dB.

For the equal power case (NFR=0 dB), the results show that the reduced-rank iterative version of the receiver outperforms the full-rank receiver, especially when the number of training samples is small. However, when the MAI become more severe (NFR=3 dB), the performance of the reduced-rank iterative receiver is degraded. A larger number of training samples is needed to obtain a better performance. When compared to the batch algorithm in Table 3 the recursive algorithm is computationally and physically much simpler, but does not perform as well as the batch algorithm. This is consistent with the results reported in [6]. To obtain a better performance, the iterative algorithm requires an equivalent number of samples as the full-rank case but with a much simpler computation. A more sophisticated iterative adaptive-weight filter algorithm can be used to obtain a better performance. However, in all cases the reduced-rank adaptive filter bank outperforms the conventional matched-filter detector.

In summary, in this invention an adaptive near-far resistant receiver for an asynchronous CDMA system is developed without the use of prior synchronization. It does not require a training period or data-free observations. Only knowledge of the spreading sequence of the desired user is necessary. These are the requirements needed by the conventional receiver of an asynchronous CDMA system. Due to the near-far resistant property of the receiver, this new CDMA receiver does not require the accurate power control that is needed in a conventional receiver system.

It is shown that the receiver obtains a better performance than that of the conventional receiver in all simulations. Though an optimum adaptive receiver that uses a full-rank covariance matrix can suppress multiple-access interference that comes from the co-existing users, its practical implementation generally is not feasible due to a lack of the sample support that is needed to estimate the covariance matrix and the substantial computations needed to invert this matrix.

To remedy this situation a lower-complexity adaptive receiver is developed that is based on the concept of the reduced-rank multistage decomposition [16]. With this method one can design a lower-complexity receiver without a significant loss in performance as compared with the full-rank system. Also the number of samples, needed to initially estimate the filter coefficients, is considerably decreased. This fact translates into an enhancement of the bandwidth efficiency of the underlying communication system or the potential performance gain when the size of the sample support for the adaptation of the filter coefficients is limited.

Finally, an iterative version of the filter that utilizes the multistage decomposition is developed. This makes possible a receiver that can be realized as a bank of iterative adaptive filters that are multiplexed in time sequence. By this means, the coefficients of the filter are updated every time new data are received. The implementation of the iterative version requires a substantially smaller memory size than the earlier FIR versions. Although, the iterative version does not perform as well as the batch version, it is of practical importance because of its much simpler realization. The convergence rate of the iterative filters used for the filter bank can be improved by the used of higher order iterative filters in this DS-CDMA system. However the bank of iterative adaptive filters developed in this invention evidently results in a very fast, efficient and effective near-far resistant asynchronous CDMA receiver. As demonstrated above, using only the first 2 stages of the proposed receiver (the rank 2 receiver) gains significant improvement in all cases over the conventional detector (which is equivalent to the first stage of the proposed receiver) while also the computational complexity of the rank 2 filter is only minimally greater than the conventional detector.

Simulation results show that the receiver of the present invention can significantly outperform the conventional DS-CDMA receiver that uses a standard matched filter for acquisition. When compared to the MMSE type receiver, the receiver can achieve a similar performance level without the requirement of synchronization or known propagation delays. Some applications for the present invention include digital wireless networks including home networking, and any other wireless application that uses code modulation.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention.

Appendix A

A. Gold Sequence Generator

Due to the large range of values of the cross-correlations of the maximum-length shift-register sequence, sometimes called m-sequence, they usually are not adopted to CDMA-like applications. PN-sequences with better periodic cross-correlation properties than m-sequences are given by the sequences of Gold (1967, 1968) and Kasami (1966), where the two-values of their sequences are +1 and −1. In Robert Gold, "Maximal recursive sequences with 3-valued recursive cross-correlation functions," *IEEE Trans. on Inform. Theory,* vol. 41, pp. 154–156, January 1968 [21], the contents of which are hereby expressly incorporated by reference, it was proved that certain pairs of m-sequences of length N exhibit a three-valued cross-correlation function [21] with the values −1, −t(m), t(m)−2}, where $$t(m) = \begin{cases} 2^{(m+2)/2} + 1 & (\text{odd } m) \\ 2^{(m+2)/2} + 1 & (\text{even } m) \end{cases}$$

and where m denotes an m-stage shift register of sequence length $N=2^m-1$.

Consider the generation of the Gold sequences of length $N=31=2^5-1$ with the pair of preferred sequences, that are obtained from the book by Peterson and Weldon (W. W. Peterson and E. J. Weldon, *Error Correcting Codes,* MIT Press, Cambridge, Mass., 1972 [22], the contents of which are hereby expressly incorporated by reference) are described by the polynomials, $$g_1(D)=D^5+D^2+1,$$

$$g_2(D)=D^5+D^4+D^3+D^2+1$$

Let b and b' represent the two m-sequences with period $N=31$ that are generated by $g_1(D)$ and $g_2(D)$, respectively. The Gold family for the sequences of length 31 comprises of $2^m+1=33$ sequences given in R. L. Peterson, R. E. Ziemer, and D. E. Borth, *Introduction to Spread Spectrum Communications,* Prentice Hall, Englewood Cliffs, N.J., 1995 [23], the contents of which are hereby expressly incorporated by reference, by $$G=\{b\}\cup\{b'\}\cup\{\{b+D^\tau b'\}|0\leq\tau\leq N-1\}, \quad (56)$$

where the term $D^\tau b'$ represents a phase shift of the m-sequence b' by $\tau$ units and "∪" denotes set union. The sequences $s_1$ and s2 in the example of Section 2 are derived by setting $\tau$ in Eq. (56) equal to 0 and 1, respectively.

What is claimed is:

1. A method performed by a computer for filtering interference and noise of an asynchronous wireless signal comprising the steps of:
   receiving an asynchronous data vector including a spreading code;
   using the received asynchronous data vector, to update weight coefficients of an adaptive filter without prior knowledge of synchronization of the spreading code;
   using the updated weight coefficients information to determine synchronization of the spreading code; and
   demodulating the output of the filter using the determined synchronization of the spreading code for obtaining a filtered data vector.

2. The method of claim 1, further comprising the step of dividing the received asynchronous data vector represented by x[i] into two channels $x_1[i]$ and $d_1[i]$ using a transformation $T_1$ on x[i], represented by $T_1x[i]$, wherein the transformed data vector x[i] does not contain information about a designated sender's spreading code $s_1$, and $d_1[i]$ contains primarily only information about the spreading code $s_1$ and residual data from correlation of $s_1$ and x[i].

3. The method of claim 2, wherein the transformation $T_1$ is defined by $$T_1 = \begin{bmatrix} u_1^\dagger \\ B_1 \end{bmatrix}, \quad (16)$$

where $B_1$ is a blocking matrix whose rows are composed of any orthonormal basis set of the nullspace of the normalized signal vector $$u_1 = s_1 / \sqrt{s_1^t s_1} \,.,$$

$[.]^T$ denotes matrix transpose, and where $B_1u_1=B_1s_1=0$.

4. The method of claim 1, wherein the step of determining synchronization comprises the steps of:
computing î, the time occurrence of the information data bit, from the equation;

$$|Re\{y[\hat{\imath}]\}| = \max_{k \in \{0,1,\ldots,NS-1\}} |Re\{y[i-k]\}|, \qquad (30c)$$

where $y[i]=w[i]^\dagger x[i]$ is filtered output from a likelihood ratio test at clock time i detecting sequentially maximum of all likelihood tests in the set Y[i] given by $$Y[i]=\{|Re\{y[i]\}|,\ldots,Re\{y[i-NS+1]\}|\},$$

where N is number of chips in the spreading code, S is number of samples per chip time, and $W[i]\dagger$ is a tap-weights' vector.

5. The method of claim 1, wherein the step of updating weight coefficients comprises the steps of:
computing maximum likelihood estimator for covariance matrix $R_x[i]$ $$\hat{R}_x[i] = \frac{1}{L}\sum_{m=1}^{L} x^{(m)}[i]x^{(m)*}[i] = \frac{1}{L}X_0[i]X_0^\dagger[i]$$

wherein, $x^{(m)}[i]$ is an observation vector at a sampling time $iT_s$ of the mth symbol, L is number of independent samples of the observation vector $x^{(m)}[i]$ for the initial acquisition of detector parameters, and the data is given in matrix form by $$X_0[i]\underline{\Delta}[x^{(1)}[i],\ldots,x^{(L)}[i]];$$

computing estimate of $R_{x_1}[i]$ $$\hat{R}_{x_1}[i] = B_1\hat{R}_{x_1}[i]B_1^\dagger = \frac{1}{L}B_1 X_0[i]X_0^\dagger[i]B_1^\dagger$$

and estimate of cross-correlation vector $r_{x1}$ as, $$\hat{r}_{x_1 d_1} = B_1\hat{R}_x[i]s_1 = \frac{1}{L}B_1 X_0[i]X_0^t[i]s_1$$

computing $$w_{GSC}^\dagger[i] = r_{x_1 d_1}^\dagger[i]R_{x_1}^{-1}[i]; \qquad (29)$$

estimating $$\hat{b}_1 = \text{sgn}((u_1^\dagger - w_{GSC}^\dagger[\hat{\imath}]B_1)x[\hat{\imath}]). \qquad (35)$$

wherein $$u_1^\dagger - w_{GSC}^\dagger[i]B_1 \qquad (30a)$$

is a weight vector; and
computing output $$y[i] = (u_1^\dagger - w_{GSC}^\dagger[i]B_1)x[i]. \qquad (30b)$$

6. The method of claim 1, wherein the step of updating weight coefficients further comprises the steps of:
applying $$X_0[i]\underline{\Delta}[x^{(1)}[i],\ldots,x^{(L)}[i]],$$

wherein L is number of independent samples of an observation vector $x^{(m)}[i]$ and $s_1$ is a designated sender's spreading code;
applying $$\hat{u}_1 = \frac{s_1}{\|s_1\|};$$

applying $$\hat{B}_1 = I - \hat{u}_j\hat{u}_j^\dagger,$$

where $B_1$ is a blocking matrix whose rows are composed of any orthonormal basis set of the nullspace of the normalized signal vector $u_1=s_1/\sqrt{s_1^\dagger s_1}$., $[.]^T$ denotes matrix transpose, and where $B_1 u_1 = B_1 s_1 = 0$ (17);
for j=1 to (M−1), computing $d_j$ and $x_j$ $$d_j^t[i]\underline{\Delta}\left[\hat{d}_j^{(1)}[i],\ldots,\hat{d}_j^{(L)}[i]\right] = \hat{u}_j^t[i]X_{j-1}[i],$$

$$X_j[i]\underline{\Delta}[x_j^{(1)}[i],\ldots,x_j^{(L)}[i]] = \hat{B}_j[i]X_{j-1}[i],$$

where $d_1[i]=u_1^\dagger x[i]$ is a signal-plus-noise scalar process and $x_1[i]=B_1 x[i]$, is an (N−1)-dimensional process with the signal removed;
computing (j+1)th stage basis vector $\hat{u}_{j+1}[i]$, $$\hat{r}_{x_j d_j}[i] = \frac{1}{L}\sum_{m=1}^{L} x_j^{(m)}[i]d_j^{(m)}[i]^* = \frac{1}{L}X_j[i]d_j[i],$$

where $\hat{r}_{x_j d_j}[i]$ is estimate of cross-correlation vector $r_{xjdj}$, $$\hat{u}_{j+1}[i] = \frac{\hat{r}_{x_j d_j}[i]}{\hat{\delta}_{j+1}[i]},$$

where $\hat{\delta}_{j+1}[i]=\|\hat{r}_{x_j d_j}[i]\|$;
computing (j+1)th blocking matrix $\hat{B}_{j+1}$ $$\hat{B}_{j+1}[i]=I-\hat{u}_{j+1}[i]\hat{u}_{j+1}^\dagger[i];$$

computing $$d_M^{(m)}[i]$$

and setting it equal to Mth error signal $$\epsilon_M^{(m)}[i]$$

$$d_M^\dagger[i] \triangleq \left[\hat{d}_M^{(1)}[i], \ldots, \hat{d}_M^{(L)}[i]\right] = e_M^\dagger[i] = \hat{u}_M^\dagger[i]X_{M-1}[i];$$

applying $$\hat{\sigma}_{d_M}^2[i] = \frac{1}{L}\sum_{m=1}^{L}\left|\hat{d}_M^{(m)}[i]\right|^2 = \hat{\xi}_M[i], \hat{\omega}_M[i] = \hat{\xi}_M^{-1}[i]\hat{\delta}_M[i];$$

for j=(M−1) to 2, estimating variance of $d_j[i]$ $$\hat{\sigma}_{d_j}^2[i] = \frac{1}{L}\sum_{m=1}^{L}\left|\hat{d}_j^{(m)}[i]\right|^2;$$

estimating variance of error signal $\epsilon_j$ $$\hat{\xi}_j[i] \triangleq \hat{\sigma}_{\epsilon_j}^2[i] = \hat{\sigma}_{d_j}^2[i] - \hat{\xi}_{j+1}^{-1}[i]\hat{\delta}_{j+1}^2[i];$$

and
computing jth scalar Wiener filter $\hat{\omega}_j[i]$ $$\hat{\omega}_j[i] = \frac{\hat{\delta}_j[i]}{\hat{\xi}_j[i]}.$$

7. The method of claim 1, wherein the step of updating weight coefficients further comprises the steps of:
applying $X_0[i] \triangleq [x^{(1)}[i], \ldots, x^{(L)}[i]]$, wherein L is number of independent samples of an observation vector $x^{(m)}[i]$ and $s_1$ is a designated sender's spreading code;
applying $$\hat{u}_1 = \frac{s_1}{\|s_1\|}$$

and $x_0[i]=x[i]$, where $B_1$ is a blocking matrix whose rows are composed of any orthonormal basis set of nullspace of the normalized signal vector $u_1 = s_1/\sqrt{s_1^\dagger s_1}$., $[.]^T$ denotes matrix transpose, and where $B_1 u_1 = B_1 s_1 = 0$. (17);
for j=1 to (M−1), computing $d_j$ and $x_j$ $$d_j[i] = \hat{u}_j^\dagger[i]x_{j-1}[i]$$
$$x_j[i] = x_{j-1}[i] - \hat{u}_j[i]d_j[i]$$

where $d_1[i]=u_1^\dagger x[i]$ is a signal-plus-noise scalar process and $x_1[i]=B_1 x[i]$, is an (N−1)-dimensional process with the signal removed;
computing (j+1)th stage basis vector $\hat{u}_{j+1}[i]$, $$\hat{r}_{x_j d_j}[i] = \frac{1}{L}\sum_{m=1}^{L} x_j^{(m)}[i]d_j^{(m)}[i]^* = \frac{1}{L}X_j[i]d_j[i],$$

where $\hat{r}_{x_j d_j}[i]$ is estimate of cross-correlation vector $r_{xldl}$, $$\hat{u}_{j+1}[i] = \frac{\hat{r}_{x_j d_j}[i]}{\hat{\delta}_{j+1}[i]},$$

where $\hat{\delta}_{j+1}[i] \triangleq \|\hat{r}_{x_j d_j}[i]\|$;
computing $$d_M^{(m)}[i]$$

and setting it equal to Mth error signal $$\epsilon_M^{(m)}[i]$$

$$d_M^\dagger[i] \triangleq \left[\hat{d}_M^{(1)}[i], ., \hat{d}_M^{(L)}[i]\right] = e_M^\dagger[i] = \hat{u}_M^\dagger[i]X_{M-1}[i];$$

applying $$\hat{\sigma}_{d_M}^2[i] = \frac{1}{L}\sum_{m=1}^{L}\left|\hat{d}_M^{(m)}[i]\right|^2 = \hat{\xi}_M[i], \hat{\omega}_M[i] = \hat{\xi}_M^{-1}[i]\hat{\delta}_M[i];$$

for j=(M−1) to 2, estimating variance of $d_j[i]$, $$\hat{\sigma}_{d_j}^2[i] = \frac{1}{L}\sum_{m=1}^{L}\left|\hat{d}_j^{(m)}[i]\right|^2;$$

estimating variance of error signal $\epsilon_j$, $$\hat{\xi}_j[i] \triangleq \hat{\sigma}_{\epsilon_j}^2[i] = \hat{\sigma}_{d_j}^2[i] - \hat{\xi}_{j+1}^{-1}[i]\hat{\delta}_{j+1}^2[i];$$

and
computing jth scalar Wiener filter by $\hat{\omega}_j[i]$, $$\hat{\omega}_j[i] = \frac{\hat{\delta}_j[i]}{\hat{\xi}_j[i]}.$$

8. The method of claim 1, wherein the steps of updating weight coefficients and using the updated weight coefficients further comprises the steps of:

for k=1 to n, applying $$\hat{r}_{x_0 d_0}^{(k)}[i] = s_1, \hat{u}_1^{(k)}[i] = \frac{s_1}{\|s_1\|},$$

and $\hat{\delta}_1^{(k)}[i] = \|s_1\|$, wherein $x_0^{(k)}[i]$ is the received asynchronous data vector, $s_1$ is a designated sender's spreading code, and k is kth clock time, where k=1 is the first time the data is observed;

for j=1 to (M−1), applying $$d_j^{(k)}[i] = \hat{u}_j^{(k)}[i]^\dagger x_{j-1}^{(k)}[i], \text{ and}$$

$$x_j^{(k)}[i] = x_{j-1}^{(k)}[i] - \hat{u}_j^{(k)}[i] d_j^{(k)}[i],$$

where $d_1[i] = u_1^\dagger x[i]$ is a signal-plus-noise scalar process and $x_1[i] = B_1 x[i]$, is an (N−1)-dimensional process with the signal removed;

computing (j+1)th stage basis vector $\hat{u}_{j+1}^{(k)}[i]$, $$\hat{r}_{x_j d_j}^{(k)}[i] = (1-\alpha)\hat{r}_{x_j d_j}^{(k-1)}[i] + x_j^{(k)}[i] d_j^{(k)}[i]^*,$$

where $\hat{r}_{x_j d_j}[i]$ is estimate of cross-correlation vector $r_{x_l d_l}$, $$\hat{u}_{j+1}^{(k)}[i] = \frac{\hat{r}_{x_j d_j}^{(k)}[i]}{\hat{\delta}_{j+1}^{(k)}[i]}, \text{ wherein } \hat{\delta}_{j+1}^{(k)}[i] = \|\hat{r}_{x_j d_j}^{(k)}[i]\|$$

and α is a time constant;
applying Mth error signal $$\epsilon_M^{(k)}[i] = d_M^{(k)}[i]^\dagger = \hat{u}_M^{(k)}[i]^\dagger x_{M-1}^{(k)}[i];$$

for j=M to 2, estimating variance of error signal $$\epsilon_j^{(k)}[i]$$

$$\hat{\xi}_j^{(k)}[i] = (\hat{\delta}_{\epsilon_j}^{(k)})^2[i] = (1-\alpha)\hat{\xi}_j^{(k-1)}[i] + |\epsilon_j^{(k)}[i]|^2;$$

computing jth scalar Wiener filter $$\hat{\omega}_j^{(k)}[i]$$

$$\hat{\omega}_j^{(k)}[i] = \frac{\hat{\delta}_j^{(k)}[i]}{\hat{\xi}_j^{(k)}[i]};$$

and computing (j−1)th error signal $$\epsilon_{j-1}^{(k)}[i]$$

$$\epsilon_{j-1}^{(k)}[i] = d_{j-1}^{(k)}[i] - \hat{\omega}_j^{(k)}[i]^* \epsilon_j^{(k)}[i];$$

wherein output at time kth is $y^{(k)}[i] = \epsilon_1^{(k)}[i]$.

9. An adaptive near-far resistant receiver for an asynchronous wireless system comprising:

means for receiving an asynchronous data vector including a spreading code;

using the received asynchronous data vector, means for updating weight coefficients of an adaptive filter without prior knowledge of synchronization of the spreading code of the data vector;

using the updated weight coefficients, means for determining synchronization of the spreading code; and means for demodulating the output of the filter using the determined synchronization of the spreading code for obtaining a filtered data vector.

10. The receiver of claim 9, further comprising means for dividing the received asynchronous data vector represented by x[i] into two channels $x_1[i]$ and $d_1[i]$ using a transformation $T_1$ on x[i], represented by $T_1 x[i]$, wherein the transformed data vector x[i] does not contain information about a designated sender's spreading code $s_1$ and $d_1[i]$ contains primarily only information about the spreading code $s_1$ and residual data from correlation of $s_1$ and x[i].

11. The receiver of claim 10, wherein the transformation $T_1$ is defined by $$T_1 = \begin{bmatrix} u_1^\dagger \\ B_1 \end{bmatrix}, \quad (16)$$

where $B_1$ is a blocking matrix whose rows are composed of any orthonormal basis set of the nullspace of the normalized signal vector $$u_1 = s_1 / \sqrt{s_1^\dagger s_1},$$

$[.]^T$ denotes matrix transpose, and where $B_1 u_1 = B_1 s_1 = 0$.

12. The receiver of claim 9, wherein the means for determining the synchronization of the spreading code comprises:

means for computing $\hat{i}$, the time occurrence of the information data bit, from the equation;

$$|\text{Re}\{y[\hat{i}]\}| = \max_{k \in \{0,1,\ldots,NS-1\}} |\text{Re}\{y[i-k]\}|, \quad (30c)$$

where $y[i] = w[i]^\dagger x[i]$ is filtered output from a likelihood ratio test at clock time i detecting sequentially maximum of all likelihood ratio tests in the set Y[i] given by $Y[i] = \{|\text{Re}\{y[i]\}|, \ldots, |\text{Re}\{y[i-NS+1]\}|\}$, where N is number of chips in the spreading code and S is number of samples per chip time, and $W[i]^t$ is a tap-weights' vector.

13. The receiver of claim 9, wherein the means for using the received asynchronous data vector, to update weight coefficients further comprises:

means for applying $X_0[i] \triangleq [x^{(1)}[i], \ldots, x^{(L)}[i]]$, wherein L is number of independent samples of an observation vector $x^{(m)}[i]$ and $s_1$ is a designated sender's spreading code;

means for applying $$\hat{u}_1 = \frac{s_1}{\|s_1\|};$$

means for applying $\hat{B}_1 = I - \hat{u}_1 \hat{u}_1^\dagger$, where $B_1$ is a blocking matrix whose rows are composed of any orthonormal basis set of the nullspace of the normalized signal vector $u_1 = s_1/\sqrt{s_1^\dagger s_1}$, $[.]^T$ denoted matrix transpose, and where $B_1 u_1 = B_1 s_1 = 0$. (17);

for j=1 to (M−1), means for computing $d_j$ and $x_j$ $$d_j^\dagger[i] \triangleq [\hat{d}_j^{(1)}[i], \ldots, \hat{d}_j^{(L)}[i]] = \hat{u}_j^\dagger X_{j-1}[i],$$

$$X_j[i] \triangleq [x_j^{(1)}[i], \ldots, x_j^{(L)}[i]] = \hat{B}_j[i] X_{j-1}[i],$$

where $d_1[i] = u_1^\dagger x[i]$ is a signal-plus-noise scalar process and $x_1[i] = B_1 x[i]$, is an (N−1)-dimensional process with the signal removed;

means for computing (j+1)th stage basis vector $\hat{u}_{j+1}[i]$, $$\hat{r}_{x_j d_j}[i] = \frac{1}{L} \sum_{m=1}^{L} x_j^{(m)}[i] d_j^{(m)}[i]^* = \frac{1}{L} X_j[i] d_j[i],$$

where $\hat{r}_{x_j d_j}[i]$ is estimate of cross-correlation vector $r_{xjdj}$, $$\hat{u}_{j+1}[i] = \frac{\hat{r}_{x_j d_j}[i]}{\hat{\delta}_{j+1}[i]},$$

where $\hat{\delta}_{j+1}[i] = \|\hat{r}_{x_j d_j}[i]\|$;

means for computing (j+1)th blocking matrix $\hat{B}_{j+1}$ $$\hat{B}_{j+1}[i] = I - \hat{u}_{j+1}[i] \hat{u}_{j+1}^\dagger[i];$$

means for computing $$d_M^{(m)}[i]$$

and set it equal to Mth error signal $$\epsilon_M^{(m)}[i]$$

$$d_M^\dagger[i] \triangleq [\hat{d}_M^{(1)}[i], \ldots, \hat{d}_M^{(L)}[i]] = e_M^\dagger[i] = \hat{u}_M^\dagger[i] X_{M-1}[i];$$

means for applying $$\hat{\sigma}_{d_M}^2[i] = \frac{1}{L} \sum_{m=1}^{L} |\hat{d}_M^{(m)}[i]|^2 = \hat{\xi}_M[i], \hat{\omega}_M[i] = \hat{\xi}_M^{-1}[i] \hat{\delta}_M[i];$$

for j=(M−1) to 2, means for estimating variance of $d_j[i]$ $$\hat{\sigma}_{d_j}^2[i] = \frac{1}{L} \sum_{m=1}^{L} |\hat{d}_j^{(m)}[i]|^2;$$

means for estimate variance of error signal $\epsilon_j$ $$\hat{\xi}_j[i] \triangleq \hat{\sigma}_{\epsilon_j}^2[i] = \hat{\sigma}_{d_j}^2[i] - \hat{\xi}_{j+1}^{-1}[i] \hat{\delta}_{j+1}^2[i];$$

and means for computing jth scalar Wiener filter $\hat{\omega}_j[i]$ $$\hat{\omega}_j[i] = \frac{\hat{\delta}_j[i]}{\hat{\xi}_j[i]}.$$

14. The receiver of claim 9, wherein the means for using the received asynchronous data vector, to update weight coefficients further comprises:

means for applying $X_0[i] \triangleq [x^{(1)}[i], \ldots, x^{(L)}[i]]$, wherein L is number of independent samples of an observation vector $x^{(m)}[i]$ and $s_1$ is a designated sender's spreading code;

means for applying $$\hat{u}_1 = \frac{s_1}{\|s_1\|}$$

and $x_0[i] = x[i]$, where $B_1$ is a blocking matrix whose rows are composed of any orthonormal basis set of the nullspace of the normalized signal vector $u_1 = s_1/\sqrt{s_1^\dagger s_1}$, $[.]^T$ denotes matrix transpose, and where $B_1 u_1 = B_1 s_1 = 0$. (17);

for j=1 to (M−1), means for computing $d_j$ and $x_j$ $$d_j[i] = \hat{u}_j^\dagger[i] x_{j-1}[i]$$

$$x_j[i] = x_{j-1}[i] - \hat{u}_j[i] d_j[i]$$

$$d_j^\dagger[i] \triangleq [\hat{d}_j^{(1)}[i], \ldots, \hat{d}_j^{(L)}[i]] = \hat{u}_j^\dagger[i] X_{j-1}[i],$$

$$X_j[i] \triangleq [x_j^{(1)}[i], \ldots, x_j^{(L)}[i]] = X_{j-1}[i] - \hat{u}_j[i] d_j^\dagger[i],$$

where $d_1[i] = u_1^\dagger x[i]$ is a signal-plus-noise scalar process and $x_1[i] = B_1 x[i]$, is an (N−1)-dimensional process with the signal removed;

means for computing (j+1)th stage basis vector $\hat{u}_{j+1}[i]$, $$\hat{r}_{x_j d_j}[i] = \frac{1}{L}\sum_{m=1}^{L} x_j^{(m)}[i] d_j^{(m)}[i]^* = \frac{1}{L} X_j[i] d_j[i],$$

where $\hat{r}_{x_j d_j}[i]$ is estimate of cross-correlation vector $r_{xxldl}$, $$\hat{u}_{j+1}[i] = \frac{\hat{r}_{x_j d_j}[i]}{\hat{\delta}_{j+1}[i]},$$

where $\hat{\delta}_{j+1}[i] = \|\hat{r}_{x_j d_j}[i]\|$;
means for computing $$d_M^{(m)}[i]$$

and set it equal to Mth error signal $$\epsilon_M^{(m)}[i]$$

$$d_M^\dagger[i] \triangleq \left[\hat{d}_M^{(1)}[i], , \hat{d}_M^{(L)}[i]\right] = e_M^\dagger[i] = \hat{u}_M^\dagger[i] X_{M-1}[i];$$

means for applying $$\hat{\sigma}_{d_M}^2[i] = \frac{1}{L}\sum_{m=1}^{L} \left|\hat{d}_M^{(m)}[i]\right|^2 = \hat{\xi}_M[i], \hat{\omega}_M[i] = \hat{\xi}_M^{-1}[i]\hat{\delta}_M[i];$$

for j=(M−1) to 2, means for estimating variance of $d_j[i]$, $$\hat{\sigma}_{d_j}^2[i] = \frac{1}{L}\sum_{m=1}^{L}\left|\hat{d}_j^{(m)}[i]\right|^2;$$

means for estimating variance of error signal $\epsilon_j$ $$\hat{\xi}_j[i] \triangleq \hat{\sigma}_{\epsilon_j}^2[i] = \hat{\sigma}_{d_j}^2[i] - \hat{\xi}_{j+1}^{-1}[i]\hat{\delta}_{j+1}^2[i];$$

and
means for computing jth scalar Wiener filter by $\hat{\omega}_j[i]$, $$\hat{\omega}_j[i] = \frac{\hat{\delta}_j[i]}{\hat{\xi}_j[i]}.$$

15. The receiver of claim 9, wherein the means for using the received asynchronous data and updates weight coefficients further comprises:

for k=1 to n, means for applying $$\hat{r}_{x_0 d_0}^{(k)}[i] = s_1, \hat{u}_1^{(k)}[i] = \frac{s_1}{\|s_1\|}, \text{ and } \hat{\delta}_1^{(k)}[i] = \|s_1\|,$$

wherein $x_0^{(k)}[i]$ is the received asynchronous data vector, $s_1$ is a designated sender's spreading code, and k is kth clock time, where k=1 is the first time the data is observed;
for j=1 to (M−1), means for applying $$d_j^{(k)}[i] = \hat{u}_j^{(k)}[i]^\dagger x_{j-1}^{(k)}[i], \text{ and}$$
$$x_j^{(k)}[i] = x_{j-1}^{(k)}[i] - \hat{u}_j^{(k)}[i] d_j^{(k)}[i],$$

where $d_1[i] = u_1^\dagger x[i]$ is a signal-plus-noise scalar process and $x_1[i] = B_1 x[i]$, is an (N−1)-dimensional process with the signal removed;
means for computing (j+1)th stage basis vector, $$\hat{u}_{j+1}^{(k)}[i],$$

$$\hat{r}_{x_j d_j}^{(k)}[i] = (1-\alpha)\hat{r}_{x_j d_j}^{(k-1)}[i] + x_j^{(k)}[i] d_j^{(k)}[i]^*,$$

where $\hat{r}_{x_j d_j}[i]$ is estimate of cross-correlation vector $r_{xldl}$, $$\hat{u}_{j+1}^{(k)}[i] = \frac{\hat{r}_{x_j d_j}^{(k)}[i]}{\hat{\delta}_{j+1}^{(k)}[i]}, \text{ wherein } \hat{\delta}_{j+1}^{(k)}[i] = \left\|\hat{r}_{x_j d_j}^{(k)}[i]\right\|$$

and $\alpha$ is a time constant;
means for applying $$\epsilon_M^{(k)}[i] = d_M^{(k)}[i]^\dagger = \hat{u}_M^{(k)}[i]^\dagger x_{M-1}^{(k)}[i];$$

for j=M to 2, means for estimating variance of error signal $\epsilon_j^{(k)}[i]$ $$\hat{\xi}_j^{(k)}[i] = (\hat{\delta}_{\epsilon_j}^{(k)})^2[i] = (1-\alpha)\hat{\xi}_j^{(k-1)}[i] + |\epsilon_j^{(k)}[i]|^2;$$

means for computing jth scalar Wiener filter $$\hat{\omega}_j^{(k)}[i]$$

$$\hat{\omega}_j^{(k)}[i] = \frac{\hat{\delta}_j^{(k)}[i]}{\hat{\xi}_j^{(k)}[i]};$$

and
means for computing (j–1)th error signal $$\epsilon_{j-1}^{(k)}[i]$$

$$\epsilon_{j-1}^{(k)}[i] = d_{j-1}^{(k)}[i] - \hat{\omega}_j^{(k)}[i]^* \epsilon_j^{(k)}[i];$$

wherein output at time kth is $$y^{(k)}[i] = \epsilon_1^{(k)}[i].$$

16. The receiver of claim 9, wherein the means for using the received asynchronous data vector, to update weight coefficients further comprises:
means for computing maximum likelihood estimator for covariance matrix $R_x[i]$ $$\hat{R}_x[i] = \frac{1}{L} \sum_{m=1}^{L} x^{(m)}[i] x^{(m)*}[i] = \frac{1}{L} X_0[i] X_0^\dagger[i]$$

wherein, $x^{(m)}[i]$ is an observation vector at a sampling time $iT_s$ of the mth symbol, L is the number of independent samples of the observation vector $x^{(m)}[i]$ for the initial acquisition of detector parameters, and the data is given in matrix form by $$X_0[i] \underline{\Delta} [x^{(1)}[i], \ldots, x^{(L)}[i]];$$

means for computing estimate of $R_{x_1}[i]$ $$\hat{R}_{x_1}[i] = B_1 \hat{R}_{x_1}[i] B_1^\dagger = \frac{1}{L} B_1 X_0[i] X_0^\dagger[i] B_1^\dagger$$

and estimate of cross-correlation vector $r_{x1d1}$ as, $$\hat{r}_{x_1 d_1} = B_1 \hat{R}_x[i] s_1 = \frac{1}{L} B_1 X_0[i] X_0^t[i] s_1$$

means for computing $$w_{GSC}^\dagger[i] = r_{x_1 d_1}^\dagger[i] R_{x_1}^{-1}[i]; \tag{29}$$

means for estimating $$\hat{b}_1 = sgn((u_1^t - w_{GSC}^t[\hat{i}] B_1) x[\hat{i}]), \tag{35}$$

wherein $$u_1^\dagger - w_{GSC}^\dagger[i] B_1 \tag{30a}$$

is a weight vector; and
means for computing output $$y[i] = (u_1^\dagger - w_{GSC}^\dagger[i] B_1) x[i]. \tag{30b}$$

17. A digital signal processor having stored thereon a set of instructions including instructions for filtering interference and noise of an asynchronous wireless signal, when executed, the instructions cause the digital signal processor to perform the steps of:
receiving an asynchronous data vector including a spreading code;
using the received asynchronous data vector, updating weight coefficients of an adaptive filter without prior knowledge of synchronization of the spreading code of the data vector;
using the updated weight coefficients information data bits to determine the synchronization of the spreading code of the data vector; and
demodulating the output of the filter using the determined synchronization of the spreading code of the data vector for obtaining a filtered data vector.

18. The digital signal processor of claim 17, further comprising instructions for dividing the received asynchronous data vector represented by x[i] into two channels $x_1[i]$ and $d_1[i]$ using a transformation $T_1$ on x[i], represented by $T_1 x[i]$, wherein the transformed data vector x[i] does not contain information about a designated sender's spreading code $s_1$, and $d_1[i]$ contains primarily only information about the spreading code $s_1$ and residual data from correlation of $s_1$ and x[i].

19. The digital signal processor of claim 18, wherein the transformation $T_1$ is defined by $$T_1 = \begin{bmatrix} u_1^\dagger \\ B_1 \end{bmatrix}, \tag{16}$$

where $B_1$ is a blocking matrix whose rows are composed of any orthonormal basis set of the nullspace of the normalized signal vector $$u_1 = s_1 / \sqrt{s_1^\dagger s_1},$$

$[.]^T$ denotes matrix transpose and where $B_1 u_1 = B_1 s_1 = 0$.

20. The digital signal processor of claim 17, wherein the instructions for determining synchronization comprises instructions for:
computing $\hat{i}$, the time occurrence of the information data bit, from the equation;

$$|Re\{y[\hat{i}]\}| = \max_{k \in \{0,1,\ldots,NS-1\}} |Re\{y[i-k]\}|, \tag{30c}$$

where $y[i] = w[i]^\dagger x[i]$ is filtered output from a likelihood test at clock time I detecting sequentially maximum of all likelihood tests in the set Y[i] given by Y[i]={|Re{y [i]}|, . . . ,|Re{y[i−NS+1]}|}, where N is number of chips in the spreading code and S is number of samples per chip time, and $W[i]^t$ is a tap-weights' vector.

21. An adaptive receiver for filtering interference and noise of an asynchronous wireless signal comprising:
   means for receiving an asynchronous data vector including information data bits;
   means for updating weight coefficients of an adaptive filter without a prior knowledge of synchronization of the information data bits;
   using the updated weight coefficient, means for determining the start of the information data bits; and
   means for demodulating the output of the adaptive filter.

22. The adaptive receiver of claim 21, further comprising means for dividing the data vector represented by x[i] into two channels $x_1[i]$ and $d_1[i]$ using a transformation $T_1$ on x[i], represented by $T_1 x[i]$, wherein the transformed data vector x[i] does not contain information about a designated sender's spreading code $s_1$, and $d_1[i]$ contains primarily only information about the spreading code $s_1$ and residual data from correlation of $s_1$ and x[i].

23. The adaptive receiver of claim 22, wherein the transformation $T_1$ is defined by $$T_1 = \begin{bmatrix} u_1^\dagger \\ B_1 \end{bmatrix}, \quad (16)$$

where $B_1$ is a blocking matrix whose rows are composed of any orthonormal basis set of the nullspace of the normalized signal vector $$u_1 = s_1 / \sqrt{s_1^\dagger s_1},$$

$[.]^T$ denotes matrix transpose, and where $B_1 u_1 = B_1 s_1 = 0$.

24. The adaptive receiver of claim 21, wherein the means for determining the start of the information data bits comprises means for:
   computing $\hat{i}$, the time occurrence of the information data bit, from the equation;

$$|\text{Re}\{y[\hat{i}]\}| = \max_{k \in \{0,1,\ldots,NS-1\}} |\text{Re}\{y[i-k]\}|, \quad (30c)$$

where $y[i] = w[i]^\dagger x[i]$ is filtered output from a likelihood ratio test at clock time i detecting sequentially maximum of all likelihood ratio tests in the set Y[i] given by $Y[i] = \{|\text{Re}\{y[i]\}|, \ldots, |\text{Re}\{y[i-NS+1]\}|\}$, where N is number of chips in the spreading code and S is number of samples per chip time, and $W[i]^t$ is a tap-weights' vector.

25. The adaptive receiver of claim 21, wherein the means for determining the start of the information data bits comprises:
   for k=1 to n, means for applying $$\hat{r}_{x_0 d_0}^{(k)}[i] = s_1, \quad \hat{u}_1^{(k)}[i] = \frac{s_1}{\|s_1\|}, \quad \text{and } \hat{\delta}_1^{(k)}[i] = \|s_1\|, \text{ wherein } x_0^{(k)}[i]$$

is the received asynchronous data vector, $s_1$ is a designated sender's spreading code, and k is kth clock time, where k=1 is the first time the data is observed;

for j=1 (M−1), means for applying $$d_j^{(k)}[i] = \hat{u}_j^{(k)}[i]^\dagger x_{j-1}^{(k)}[i], \text{ and}$$

$$x_j^{(k)}[i] = x_{j-1}^{(k)}[i] - \hat{u}_j^{(k)}[i] d_j^{(k)}[i],$$

where $d_1[i] = u_1^\dagger x[i]$ is a signal-plus-noise scalar process and $x_1[i] = B_1 x[i]$, is an (N−1)-dimensional process with the signal removed;
means for computing (j+1)th stage basis vector $$\hat{u}_{j+1}^{(k)}[i],$$

$$\hat{r}_{x_j d_j}^{(k)}[i] = (1-\alpha)\hat{r}_{x_j d_j}^{(k-1)}[i] + x_j^{(k)}[i]d_j^{(k)}[i]^*,$$

where $\hat{r}_{x_j d_j}[i]$ is estimate of cross-correlation vector $r_{xldl}$, $$\hat{u}_{j+1}^{(k)}[i] = \frac{\hat{r}_{x_j d_j}^{(k)}[i]}{\hat{\delta}_{j+1}^{(k)}[i]}, \text{ wherein } \hat{\delta}_{j+1}^{(k)}[i] = \|\hat{r}_{x_j d_j}^{(k)}[i]\|$$

and $\alpha$ is a time constant;
means for applying Mth error signal $$\epsilon_M^{(k)}[i] = d_M^{(k)}[i]^\dagger = \hat{u}_M^{(k)}[i]^\dagger x_{M-1}^{(k)}[i];$$

for j=M to 2, means for estimating variance of error signal $$\epsilon_j^{(k)}[i]$$

$$\hat{\xi}_j^{(k)}[i] = (\hat{\delta}_{\epsilon_j}^{(k)})^2[i] = (1-\alpha)\hat{\xi}_j^{(k-1)}[i] + |\epsilon_j^{(k)}[i]|^2;$$

means for computing jth scalar Wiener filter $$\hat{\omega}_j^{(k)}[i]$$

$$\hat{\omega}_j^{(k)}[i] = \frac{\hat{\delta}_j^{(k)}[i]}{\hat{\xi}_j^{(k)}[i]};$$

and
means for computing (j−1)th error signal $$\epsilon_{j-1}^{(k)}[i]$$

$$\epsilon_{j-1}^{(k)}[i] = d_{j-1}^{(k)}[i] - \hat{\omega}_j^{(k)}[i]^* \epsilon_j^{(k)}[i];$$

wherein output at time kth is $$y^{(k)}[i] = \epsilon_1^{(k)}[i].$$

* * * * *

UNITED STATES PATENT AND TRADEMARK OFFICE
CERTIFICATE OF CORRECTION

PATENT NO.       : 7,061,970 B2
APPLICATION NO.  : 09/883835
DATED            : June 13, 2006
INVENTOR(S)      : Reed et al.

It is certified that error appears in the above-identified patent and that said Letters Patent is hereby corrected as shown below:

On the Title Page

(56) Reference Cited                          Delete "Issue: Dec. 12, 1994",
Other Publications                            Insert --Issue: 12, Dec. 1994--
MMSE interference suppression for direct-
sequence...

(57) Abstract, line 1                         Delete "discloses",
                                              Insert --is--

(57) Abstract, line 16                        Delete "systems",
                                              Insert --system--

(57) Abstract, line 17                        Delete "for;",
                                              Insert --for--

(57) Abstract, line 24                        Delete "bank,",
                                              Insert --bank.--

(56) References Cited                         Delete "Issue: Apr. 4, 1990",
Other Publications                            Insert --Issue: 4, Apr. 1990--
pg. 2, Col. 1
Near-far resistance of multiuser detectors..

(56) References Cited                         After "Without",
Other Publications                            Insert --A--
pg. 2, Col. 1
Parkvall et al., Near-Far Resistent
Receivers...

In the Claims

Column 28, line 64, Claim 3                   Delete " $u_1 = s_1/\sqrt{s_1^t s_1}$ ", Insert -- $u_1 = s_1/\sqrt{s_1^t s_1}$ --

Column 29, line 3, Claim 4                    Delete "$\hat{1}$",

Insert -- $\hat{i}$ --

UNITED STATES PATENT AND TRADEMARK OFFICE
CERTIFICATE OF CORRECTION

PATENT NO. : 7,061,970 B2
APPLICATION NO. : 09/883835
DATED : June 13, 2006
INVENTOR(S) : Reed et al.

It is certified that error appears in the above-identified patent and that said Letters Patent is hereby corrected as shown below:

| | |
|---|---|
| Column 29, line 41, Claim 5 | Delete "$r_{xl}$", Insert --$r_{xldl}$-- |
| Column 29, line 45, Claim 5 | Delete "$\frac{1}{L}X_0[i]X_0^t[i]$", Insert --$\frac{1}{L}X_0[i]X_0^t[i]$-- |
| Column 30, line 35, Claim 6 | Delete "$u_1 = s_1/\sqrt{s_1^t s_1}$", Insert --$u_1 = s_1/\sqrt{s_1^t s_1}$-- |
| Column 30, line 41, Claim 6 | Delete "$\hat{u}_1^t[i] X_{j-1}[i]$", Insert --$\hat{u}_j^t[i] X_{j-1}[i]$-- |
| Column 30, line 46, Claim 6 | Delete "$u_1^t x[i]$", Insert --$u_1^t x[i]$-- |
| Column 31, line 57, Claim 7 | Delete "$u_1 = s_1/\sqrt{s_1^t s_1}$", Insert --$u_1 = s_1/\sqrt{s_1^t s_1}$-- |
| Column 33, line 22, Claim 8 | Delete "$u_1^t x[i]$", Insert --$u_1^t x[i]$-- |
| Column 35, line 18, Claim 13 | Delete "$u_1 = s_1/\sqrt{s_1^t s_1}$ .,[.]$^T$ denoted", Insert --$u_1 = s_1/\sqrt{s_1^t s_1}$ .,[.]$^T$ denotes-- |
| Column 36, line 65, Claim 14 | Delete "$u_1^t x[i]$", Insert --$u_1^t x[i]$-- |
| Column 37, line 5, Claim 14 | Delete "$\hat{r}_{x_j d_l}[i]$", Insert --$\hat{r}_{x_j d_j}[i]$-- |

UNITED STATES PATENT AND TRADEMARK OFFICE
CERTIFICATE OF CORRECTION

PATENT NO. : 7,061,970 B2
APPLICATION NO. : 09/883835
DATED : June 13, 2006
INVENTOR(S) : Reed et al.

It is certified that error appears in the above-identified patent and that said Letters Patent is hereby corrected as shown below:

Column 37, line 9, Claim 14
Delete "$r_{xxldl}$"
Insert --$r_{xldl}$--

Column 38, line 19, Claim 15
Delete " $u_1^t x[i]$ ",
Insert -- $u_1^t x[i]$ --

Column 39, line 47, Claim 16
Delete " $\frac{1}{L} B_1 X_0[i] X_0^t[i] s_1$ ",
Insert -- $\frac{1}{L} B_1 X_0[i] X_0^t[i] s_1$ --

Column 39, line 56, Claim 16
Delete " $\hat{b}_1 = \text{sgn}((u_1^t - w_{GSC}^t[\hat{i}] B_1) x[\hat{i}])$ ",
Insert -- $\hat{b}_1 = \text{sgn}((u_1^t - w_{GSC}^t[\hat{i}] B_1) x[\hat{i}])$ --

Column 40, line 11, Claim 17
Delete "cause",
Insert --causing--

Column 40, line 53, Claim 20
Delete "comprises",
Insert --comprise--

Column 40, line 56, Claim 20
Delete "equation;",
Insert --equation:--

Column 41, line 53, Claim 24
Delete "$W[i]^b$",
Insert --$W[i]^\dagger$--

Column 41, line 58, Claim 25
Delete "k=1to n",
Insert --k=1 to n--

UNITED STATES PATENT AND TRADEMARK OFFICE
CERTIFICATE OF CORRECTION

PATENT NO. : 7,061,970 B2
APPLICATION NO. : 09/883835
DATED : June 13, 2006
INVENTOR(S) : Reed et al.

It is certified that error appears in the above-identified patent and that said Letters Patent is hereby corrected as shown below:

Column 42, line 6, Claim 25    Delete " $u_1^{\,\prime}x[i]$ ",

Insert -- $u_1^{\prime}x[i]$ --

Signed and Sealed this

Seventeenth Day of July, 2007

JON W. DUDAS
*Director of the United States Patent and Trademark Office*